(12) United States Patent
Young

(10) Patent No.: US 9,358,546 B1
(45) Date of Patent: Jun. 7, 2016

(54) MULTI-CONNECTOR HAMMER AND PROTECTIVE ARM

(71) Applicant: Genesis III, Inc., Prophetstown, IL (US)

(72) Inventor: Roger Young, Prophetstown, IL (US)

(73) Assignee: Genesis III, Inc., Prophetstown, IL (US)

( * ) Notice: Subject to any disclaimer, the term of this patent is extended or adjusted under 35 U.S.C. 154(b) by 0 days.

(21) Appl. No.: 14/270,888

(22) Filed: May 6, 2014

Related U.S. Application Data

(63) Continuation of application No. 13/566,967, filed on Aug. 3, 2012, now Pat. No. 8,800,903.

(60) Provisional application No. 61/514,644, filed on Aug. 3, 2011.

(51) Int. Cl.
B02C 13/18 (2006.01)
B02C 13/28 (2006.01)

(52) U.S. Cl.
CPC .............. *B02C 13/28* (2013.01); *B02C 13/18* (2013.01); *B02C 13/2804* (2013.01); *B02C 2013/2808* (2013.01)

(58) Field of Classification Search
CPC  B02C 13/08; B02C 2013/8082; B02C 13/18; B02C 13/2804; B02C 13/02; B02C 2013/28088
USPC ...................................... 241/194, 195, 189.1
See application file for complete search history.

(56) References Cited

U.S. PATENT DOCUMENTS

| | | |
|---|---|---|
| 758,288 A | 4/1904 | Williams |
| 858,772 A | 7/1907 | Williams |
| 906,364 A | 12/1908 | Williams |
| 1,016,979 A | 2/1912 | Williams |
| 1,041,495 A | 10/1912 | Liggett et al. |
| 1,085,692 A | 2/1914 | Liggett |
| 1,266,894 A | 5/1918 | Williams |
| RE14,865 E | 6/1918 | Plaisted |
| RE14,920 E | 4/1919 | Plaisted |
| 1,433,042 A | 10/1922 | Sedberry |
| 1,444,990 A | 2/1923 | Wauthier |
| 1,630,021 A | 5/1927 | Lucas |
| 1,678,723 A | 7/1928 | Clement |
| 1,693,058 A | 11/1928 | Shelton |

(Continued)

OTHER PUBLICATIONS

Jacobs Corporation. Advertisement. "The Pentagon Hammer System" Nov. 19, 2008.

*Primary Examiner* — Faye Francis

(74) *Attorney, Agent, or Firm* — Hamilton IP Law, PC; Jay R. Hamilton; Charles A. Damschen

(57) ABSTRACT

The various embodiments disclosed and pictured illustrate a multi-connector hammer for comminuting various materials. The illustrative embodiments pictured and described herein are primarily for use with a rotatable hammermill assembly. The multi-connector hammer includes a connection portion having a rod hole therein, a contact portion for delivery of energy to the material to be comminuted, and a multi-connector neck portion affixing the connection portion to the contact portion. In other embodiments, a shoulder is positioned around the periphery of the rod hole for added strength. In still other embodiments, a neck reinforcement is positioned along a portion of the neck for increased strength. A weld or plurality of welds may be affixed to various surfaces of the contact portion to aide in comminuting and/or longevity of the multi-connector hammer.

14 Claims, 38 Drawing Sheets

(56) References Cited

U.S. PATENT DOCUMENTS

| | | |
|---|---|---|
| 1,759,905 A | 5/1930 | Keith |
| 1,760,097 A | 5/1930 | Williams |
| 1,761,038 A | 6/1930 | Liggett |
| 1,787,526 A | 1/1931 | Honstain |
| 1,821,912 A | 9/1931 | Pfeiffer |
| 1,827,986 A | 10/1931 | Inglehart |
| 1,829,325 A | 10/1931 | Alfred |
| 1,854,844 A | 4/1932 | Kaemmerling |
| 1,889,129 A | 11/1932 | Nielsen |
| 1,911,718 A | 5/1933 | Saunders |
| 1,954,175 A | 4/1934 | Jensen |
| 1,997,553 A | 4/1935 | Taylor, Jr. et al. |
| 2,015,581 A | 9/1935 | Armour |
| 2,207,455 A | 7/1940 | Clement |
| 2,237,510 A | 4/1941 | Tankersley |
| 2,244,577 A | 6/1941 | Schreiber |
| 2,404,778 A | 7/1946 | Allison |
| 2,531,597 A | 11/1950 | Anderson |
| 2,566,758 A | 9/1951 | Anderson |
| 2,566,798 A | 9/1951 | Hiller |
| 2,602,597 A | 7/1952 | Ball |
| 2,607,538 A | 8/1952 | Larson |
| 2,763,439 A | 9/1956 | Mankoff |
| 3,045,934 A | 7/1962 | Eilers |
| 3,222,854 A | 12/1965 | Barth |
| 3,278,126 A | 10/1966 | Ratkowski |
| 3,379,383 A | 4/1968 | Stepanek |
| 3,482,789 A | 12/1969 | Newell |
| 3,598,008 A | 8/1971 | Jacobson et al. |
| 3,627,212 A | 12/1971 | Stanton |
| 3,738,586 A | 6/1973 | Fabert |
| 4,129,262 A | 12/1978 | Lowry |
| 4,141,512 A | 2/1979 | Francis |
| 4,142,687 A | 3/1979 | Potwin |
| 4,162,767 A | 7/1979 | Hahn |
| 4,177,956 A | 12/1979 | Fawcett |
| 4,341,353 A | 7/1982 | Hamilton et al. |
| 4,343,438 A | 8/1982 | Slikas et al. |
| 4,352,774 A | 10/1982 | Hornberger |
| 4,558,826 A | 12/1985 | Martinek |
| 4,729,516 A | 3/1988 | Williams, Jr. |
| 4,795,103 A | 1/1989 | Lech |
| 4,856,170 A | 8/1989 | Kachik |
| 4,907,750 A | 3/1990 | Seifert |
| 4,915,310 A | 4/1990 | Stelk |
| 5,002,233 A | 3/1991 | Williams |
| 5,072,888 A | 12/1991 | Stelk |
| 5,364,038 A | 11/1994 | Prew |
| 5,377,919 A | 1/1995 | Rogers et al. |
| 5,381,975 A | 1/1995 | Chon |
| 5,443,216 A | 8/1995 | Lajoie |
| 5,465,912 A | 11/1995 | Graybill |
| 5,605,291 A | 2/1997 | Doskocil |
| 5,611,496 A | 3/1997 | Fleenor |
| 5,628,467 A | 5/1997 | Graveman |
| 5,692,688 A | 12/1997 | Waitman et al. |
| 5,722,607 A | 3/1998 | Hellmich |
| 5,842,653 A | 12/1998 | Elliott et al. |
| 5,904,306 A | 5/1999 | Elliott et al. |
| 6,045,072 A | 4/2000 | Zehr |
| 6,131,838 A | 10/2000 | Balvanz |
| 6,142,400 A | 11/2000 | Balvanz et al. |
| 6,260,778 B1 | 7/2001 | Wenger |
| 6,364,227 B1 | 4/2002 | Dorscht |
| 6,419,173 B2 | 7/2002 | Balvanz et al. |
| 6,481,654 B1 | 11/2002 | Balvanz |
| 6,517,020 B1 | 2/2003 | Smith |
| 6,622,951 B1 | 9/2003 | Recker |
| 6,971,598 B2 | 12/2005 | Schillinger et al. |
| 7,140,569 B2 | 11/2006 | Young |
| 7,325,761 B2 | 2/2008 | Chen et al. |
| 7,419,109 B1 | 9/2008 | Ronfeldt et al. |
| 7,559,497 B2 | 7/2009 | Young |
| 7,621,477 B2 | 11/2009 | Young |
| 2002/0190148 A1 | 12/2002 | Roozeboom et al. |
| 2007/0023554 A1 | 2/2007 | Young |
| 2009/0321546 A1 | 12/2009 | Plumb et al. |
| 2011/0042498 A1 | 2/2011 | Young et al. |

MULTI-CONNECTOR HAMMER AND PROTECTIVE ARM

CROSS REFERENCE TO RELATED APPLICATIONS

Applicant states that the present application is a continuation of and claims priority from U.S. patent application Ser. No. 13/566,967 filed on Aug. 3, 2012 (now U.S. Pat. No. 8,800,903), which application claimed priority from provisional U.S. Pat. App. No. 61/514,644 filed on Aug. 3, 2011, both of which applications are incorporated by reference herein in their entireties.

FIELD OF INVENTION

This invention relates generally to a device for comminuting or grinding material. More specifically, the invention is especially useful for use as a hammer in a rotatable hammermill assembly.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

A number of different industries rely on impact grinders or hammermills to reduce materials to a smaller size. For example, hammermills are often used to process forestry and agricultural products as well as to process minerals, and for recycling materials. Specific examples of materials processed by hammermills include grains, animal food, pet food, food ingredients, mulch and even bark. This invention although not limited to grains, has been specifically developed for use in the grain industry. Whole grain corn essentially must be cracked before it can be processed further. Dependent upon the process, whole corn may be cracked after tempering yet before conditioning. A common way to carry out particle size reduction is to use a hammermill where successive rows of rotating hammer like devices spinning on a common rotor next to one another comminute the grain product. For example, methods for size reduction as applied to grain and animal products are described in Watson, S. A. & P. E. Ramstad, ed. (1987, Corn: Chemistry and Technology, Chapter 11, American Association of Cereal Chemist, Inc., St. Paul, Minn.), the disclosure of which is hereby incorporated by reference in its entirety. The application of the invention as disclosed and herein claimed, however, is not limited to grain products or animal products.

Hammermills are generally constructed around a rotating shaft that has a plurality of disks provided thereon. A plurality of free-swinging hammers are typically attached to the periphery of each disk using hammer rods extending the length of the rotor. With this structure, a portion of the kinetic energy stored in the rotating disks is transferred to the product to be comminuted through the rotating hammers. The hammers strike the product, driving into a sized screen, in order to reduce the material. Once the comminuted product is reduced to the desired size, the material passes out of the housing of the hammermill for subsequent use and further processing. A hammer mill will break up grain, pallets, paper products, construction materials, and small tree branches. Because the swinging hammers do not use a sharp edge to cut the waste material, the hammer mill is more suited for processing products which may contain metal or stone contamination wherein the product the may be commonly referred to as "dirty". A hammer mill has the advantage that the rotatable hammers will recoil backwardly if the hammer cannot break the material on impact. One significant problem with hammer mills is the wear of the hammers over a relatively short period of operation in reducing "dirty" products which include materials such as nails, dirt, sand, metal, and the like. As found in the prior art, even though a hammermill is designed to better handle the entry of a "dirty" object, the possibility exists for catastrophic failure of a hammer causing severe damage to the hammermill and requiring immediate maintenance and repairs.

Hammermills may also be generally referred to as crushers—which typically include a steel housing or chamber containing a plurality of hammers mounted on a rotor and a suitable drive train for rotating the rotor. As the rotor turns, the correspondingly rotating hammers come into engagement with the material to be comminuted or reduced in size. Hammermills typically use screens formed into and circumscribing a portion of the interior surface of the housing. The size of the particulate material is controlled by the size of the screen apertures against which the rotating hammers force the material. Exemplary embodiments of hammermills are disclosed in U.S. Pat. Nos. 5,904,306; 5,842,653; 5,377,919; and 3,627,212.

The four metrics of strength, capacity, run time and the amount of force delivered are typically considered by users of hammermill hammers to evaluate any hammer to be installed in a hammermill. A hammer to be installed is first evaluated on its strength. Typically, hammermill machines employing hammers of this type are operated twenty-four hours a day, seven days a week. This punishing environment requires strong and resilient material that will not prematurely or unexpectedly deteriorate. Next, the hammer is evaluated for capacity, or more specifically, how the weight of the hammer affects the capacity of the hammermill. The heavier the hammer, the fewer hammers that may be used in the hammermill by the available horsepower. A lighter hammer then increases the number of hammers that may be mounted within the hammermill for the same available horsepower. The more force that can be delivered by the hammer to the material to be comminuted against the screen increases effective comminution (i.e. cracking or breaking down of the material) and thus the efficiency of the entire comminution process is increased. In the prior art, the amount of force delivered is evaluated with respect to the weight of the hammer.

Finally, the length of run time for the hammer is also considered. The longer the hammer lasts, the longer the machine run time, the larger profits presented by continuous processing of the material in the hammermill through reduced maintenance costs and lower necessary capital inputs. The four metrics are interrelated and typically tradeoffs are necessary to improve performance. For example, to increase the amount of force delivered, the weight of the hammer could be increased. However, because the weight of the hammer increased, the capacity of the unit typically will be decreased because of horsepower limitations. There is a need to improve upon the design of hammermill hammers available in the prior art for optimization of the four (4) metrics listed above.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 7B provides a perspective view of the multi-connector hammers shown in FIG. 7A.

FIG. 8B provides a top view of a second embodiment of a multi-connector hammer.

FIG. 10B provides a top view of the third embodiment of a multi-connector hammer with illustrative dimensions included therein.

FIG. 18B provides a perspective view of the first embodiment of the protective arm.

FIG. 21A provides a perspective view of a second embodiment of a protective arm in relation to a fourth embodiment of a multi-connector hammer.

FIG. 23A provides a perspective view of a second embodiment of a protective arm.

FIG. 24A provides a perspective view of a seventh embodiment of a multi-connector hammer.

FIG. 25A provides a perspective view of a half member of the multi-connector hammer shown in FIG. 24A.

DETAILED DESCRIPTION

Listing of Elements

Figure 1:
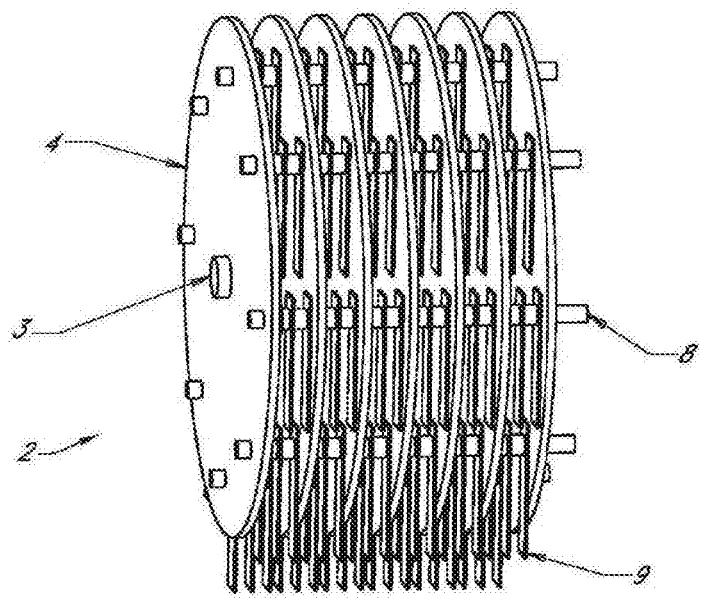
FIG. 1 provides a perspective view of the internal configuration of a hammer mill at rest as commonly found in the prior art.

| Element | Element # |
|---|---|
| Hammermill assembly | 2 |
| Hammermill drive shaft | 3 |
| End plate | 4 |
| End plate drive shaft hole | 5a |
| End plate hammer rod hole | 5b |
| Interior plate | 6 |
| Interior plate drive shaft hole | 7a |
| Interior plate hammer rod hole | 7b |
| Hammer rod | 8 |
| Spacer | 8a |
| Hammer (prior art) | 9 |
| Hammer body (prior art) | 9a |
| Hammer contact edge (prior art) | 9b |
| Hammer rod hole (prior art) | 9c |
| Multi-connector hammer | 10 |
| Seam | 12 |
| Half member | 14 |
| Connection portion | 20 |
| Connector | 22 |
| Rod hole | 24 |
| Connector interstitial area | 26 |
| Neck | 30 |
| Neck first end | 32 |
| Neck second end | 34 |
| Neck interstitial area | 36 |
| Contact portion | 40 |
| Contact member | 42 |
| Primary contact surface | 44 |
| Contact interstitial area | 46 |
| Protective arm | 50 |
| Arm connection portion | 52 |
| Arm rod hole | 52a |
| Arm spacer portion | 54 |
| Arm distal end | 56 |

ILLUSTRATIVE EMBODIMENTS

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Furthermore, any dimensions recited or called out herein are for exemplary purposes only and are not meant to limit the scope of the invention in any way unless so recited in the claims.

1. Free-Swinging Hammermill Assemblies

Figure 2:
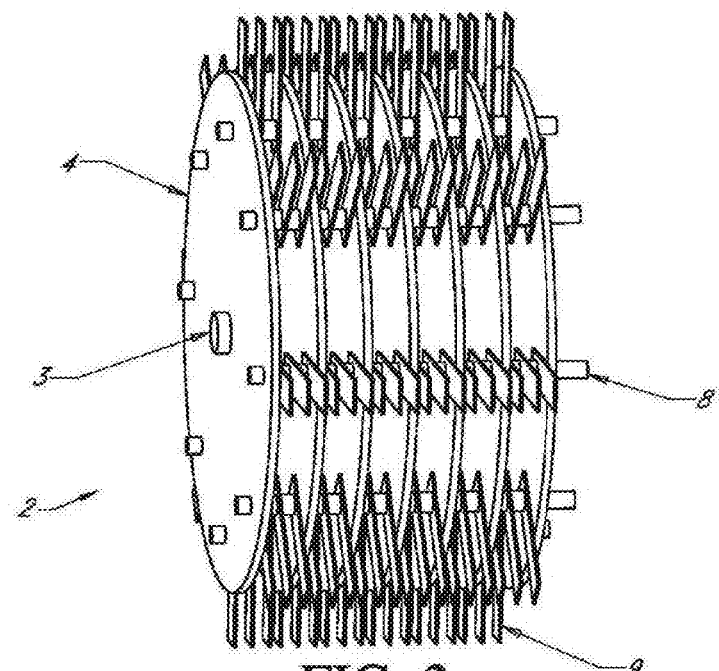
FIG. 2 provides a perspective view of the internal configuration of a hammermill during operation as commonly found in the prior art.
Figure 3:
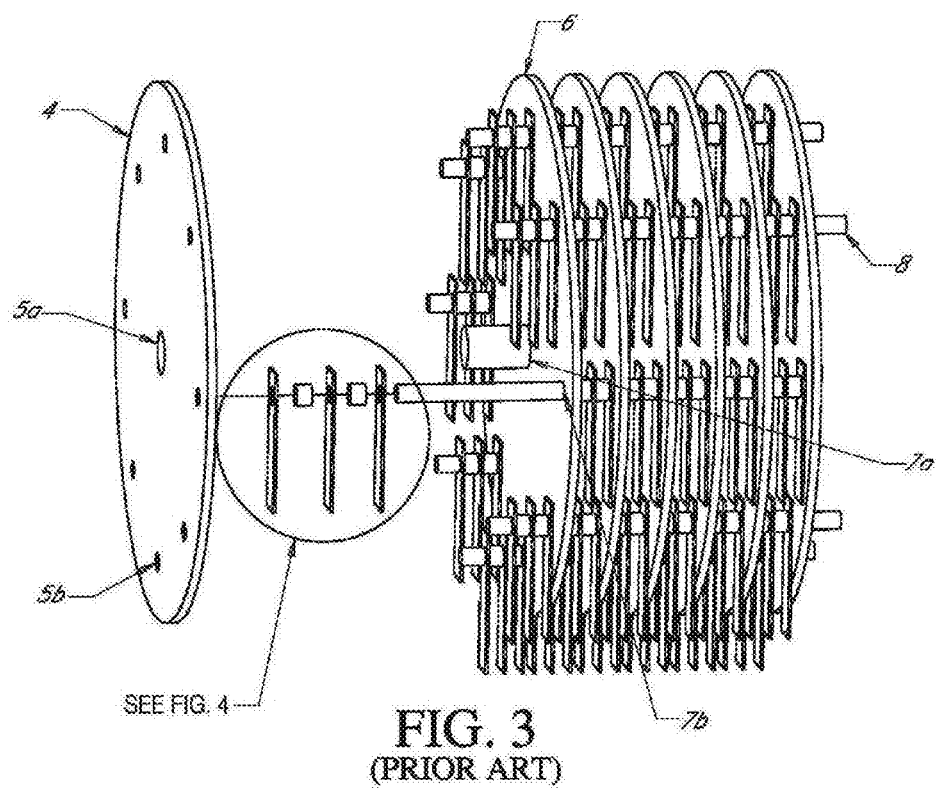
FIG. 3 provides an exploded perspective view of a hammermill as found in the prior art as shown in FIG. 1.

Referring now to the drawings, wherein like reference numerals designate identical or corresponding parts throughout the several views, FIGS. 1-3 show a hammermill assembly 2 as found in the prior art. The hammermill assembly 2 includes two end plates 4 on each end with at least one interior plate 6 positioned between the two end plates 4. The end plates 4 include an end plate drive shaft hole 5a and the interior plates 6 include an interior plate drive shaft hole 7a. A hammermill drive shaft 3 passes through the end plate drive shaft holes 5a and the interior plate drive shaft holes 7a. The end plates 4 and interior plates 6 are affixed to the hammermill drive shaft and rotatable therewith.

Each end plate 4 also includes a plurality of end plate hammer rod holes 5b, and each interior plate 6 includes a plurality of interior plate hammer rod holes 7b. A hammer rod 8 passes through corresponding end plate hammer rod holes 5b and interior plate hammer rod holes 7b. A plurality of hammers 9 are pivotally mounted to each hammer rod 8, which is shown in detail in FIG. 4. The hammers 9 are typically oriented in rows along each hammer rod 8, and each hammer rod 8 is typically oriented parallel to one another and to the hammermill drive shaft 3.

Figure 4:
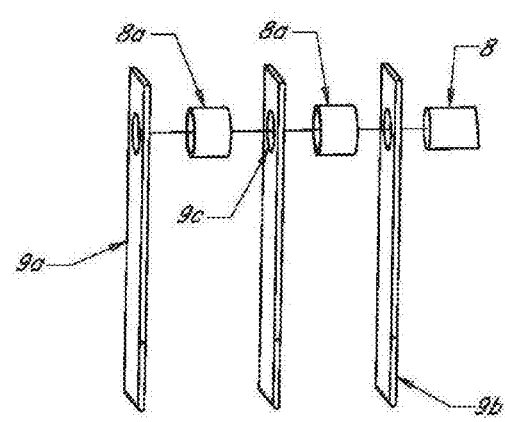
FIG. 4 provides an enlarged perspective view of the attachment methods and apparatus as found in the prior art and illustrated in FIG. 3.

Each hammer 9 includes a hammer body 9a, hammer contact edge 9b, and a hammer rod hole 9c passing through the hammer body 9a, which is shown in detail in FIG. 4. Each hammer rod 8 passes through the hammer rod hole 9c of at least one hammer 9. Accordingly, the hammers 9 pivot with respect to the hammer rod 8 to which they are attached about the center of the hammer rod hole 9c. A spacer 8a may be positioned around the hammer rod 8 and between adjacent hammers 9 or adjacent hammers 9 and plates 4, 6 to better align the hammers 9 and/or plates 4, 6, which is best shown in FIGS. 3-4. As is well known to those of skill in the art, a lock collar (not shown) would typically be placed on the end of the hammer rod 8 to compress and hold the spacers 8a and the hammers 9 in alignment. All these parts require careful and precise alignment relative to one another. This type of hammer 9, which is shown affixed to the hammermill assembly 2 shown in FIGS. 1-3 and separately in FIG. 4, is commonly referred to as free-swinging hammers 9. Free-swinging hammers 9 are hammers 9 that are pivotally mounted to the hammermill assembly 9 in a manner as described above and are oriented outwardly from the center of the hammermill assembly 2 by centrifugal force as the hammermill assembly 2 rotates.

The hammermill assembly 2 and various elements thereof rotate about the longitudinal axis of the hammermill drive shaft 3. As the hammermill assembly 2 rotates, centrifugal force causes the hammers 9 to rotate about the hammer rod 8 to which each hammer 9 is mounted. The hammermill assembly 2 is shown at rest in FIG. 1 and in a dynamic state in FIG. 2, as in operation. Free-swinging hammers 9 are often used instead of rigidly connected hammers in case tramped metal, foreign objects, or other non-crushable material enters the housing with the particulate material to be reduced, such as grain.

For effective comminution in hammermill assemblies 2 using free-swinging hammers 9, the rotational speed of the hammermill assembly 2 must produce sufficient centrifugal force to hold the hammers 9 as close to the fully extended position as possible when material is being communited. Depending on the type of material being processed, the minimum hammer tip speeds of the hammers are usually 5,000 to 11,000 feet per minute ("FPM"). In comparison, the maximum speeds depend on shaft and bearing design, but usually do not exceed 30,000 FPM. In special high-speed applications, the hammermill assemblies 2 may be configured to operate up to 60,000 FPM.

In the case of disassembly for the purposes of repair and replacement of worn or damaged parts, the wear and tear causes considerable difficulty in realigning and reassembling the various elements of the hammermill assembly 2. Moreover, the elements of the hammermill assembly 2 are typically keyed to one another, or at least to the hammermill drive shaft 3, which further complicates the assembly and disassembly process. For example, the replacement of a single hammer 9 may require disassembly of the entire hammermill assembly 2. Given the frequency at which wear parts require replacement, replacement and repairs constitute an extremely difficult and time consuming task that considerably reduces the operating time of the size reducing machine. Removing a single damaged hammer 9 may take in excess of five (5) hours due to both the hammermill assembly 2 design and the realignment difficulties related to the problems caused by impact of debris with the non-impact surfaces of the hammermill assembly 2.

Another problem found in the prior art hammermill assemblies 2 shown in FIGS. 1-3 is exposure of a great deal of the surface area of the hammermill assembly 2 elements to debris. The end plates 4 and interior plates 6, spacers 8a, and hammers 9 are all subjected to considerable contact with the debris and material within the hammermill assembly 2. This not only creates excessive wear, but contributes to realignment difficulties by bending and damaging of the various elements of the hammermill assembly 2, which may be caused by residual impact. Thus, after a period of operation, prior art hammermill assemblies 2 become even more difficult to disassemble and reassemble. The problems related to comminution service and maintenance of hammermill assemblies 2 provides abundant incentive for improvement of hammers 9 to lengthen operational run times.

2. Illustrative Embodiments of a Multi-Connector Hammer

Figure 5:
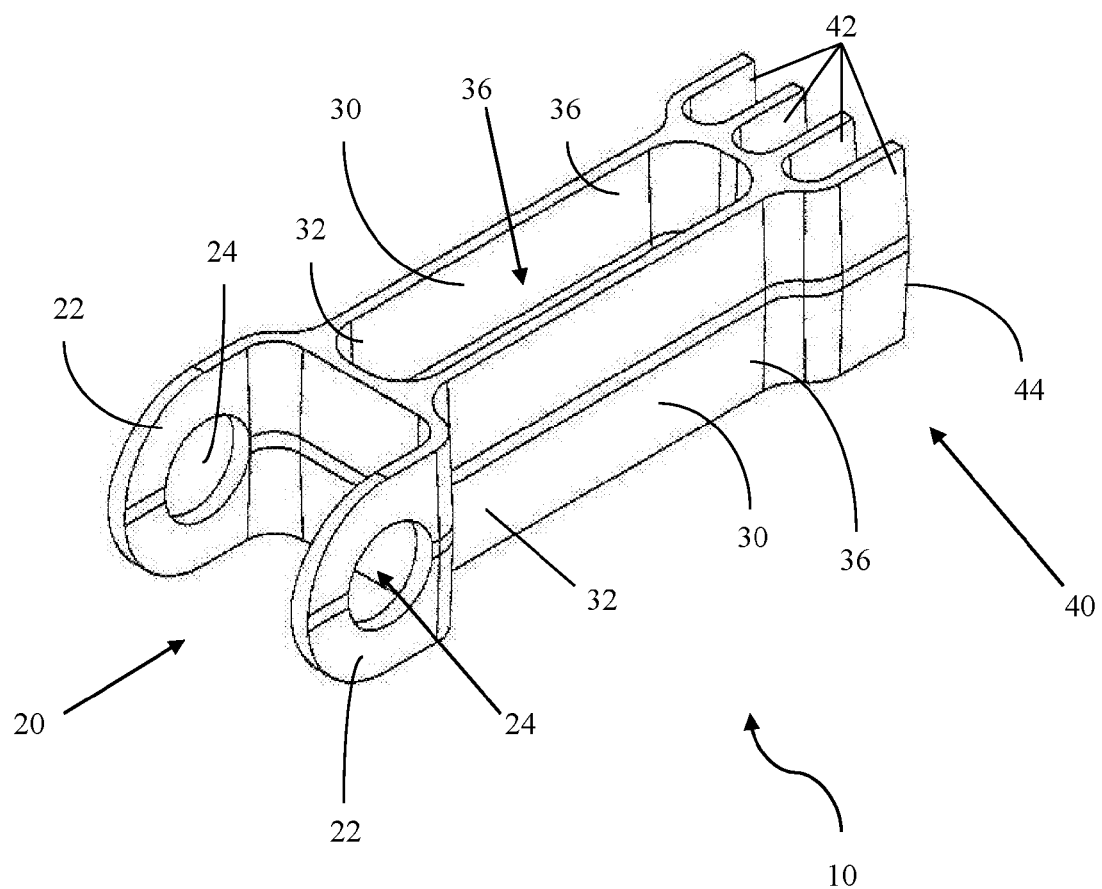
FIG. 5 provides a perspective view of a first embodiment of a multi-connector hammer.
Figure 6A:
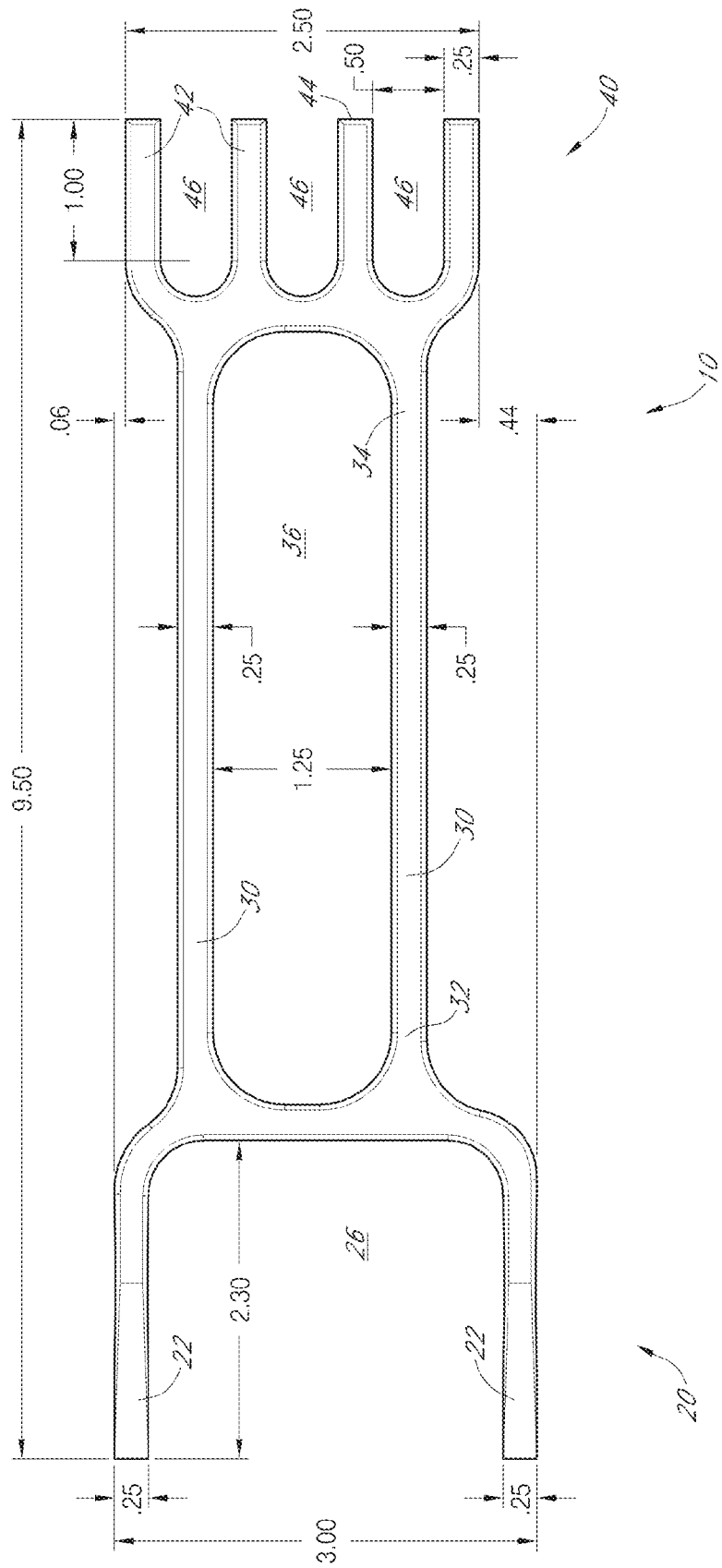
FIG. 6A provides top view of the first embodiment of a multi-connector hammer with illustrative dimensions included therein.
Figure 6B:
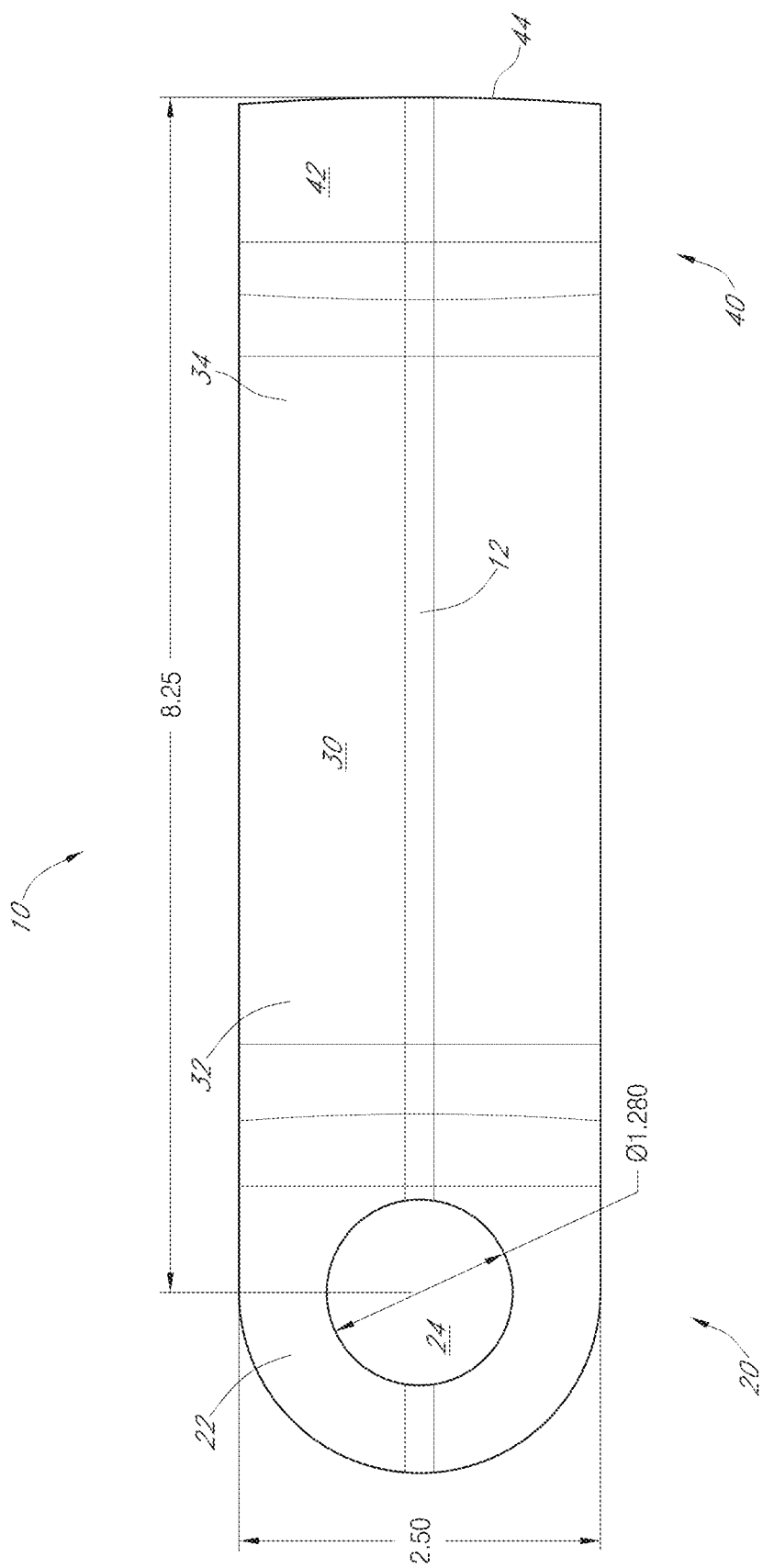
FIG. 6B provides side view of the first embodiment of a multi-connector hammer with illustrative dimensions included therein.

Referring now to the drawings, wherein like reference numerals designate identical or corresponding parts throughout the several views, FIG. 5 provides a perspective view of a first embodiment of a multi-connector hammer 10, and FIGS. 6A and 6B provide top and side views thereof, respectively.

As shown herein, the multi-connector hammer 10 generally includes a connection portion 20 and contact portion 40 connected to one another by a neck 30. The embodiment shown in FIGS. 5-7D includes at least two necks 30, whereas the embodiments shown in FIGS. 8A-10C include at least one neck 30. In both embodiments a neck first end 32 may be affixed to the connection portion 20, and a neck second end 34 may be connected to the contact portion 40. The embodiment shown in FIGS. 5-7D may also include a neck interstitial area 36 positioned between the two necks 30.

The connection portion 20 generally may be configured for attachment to a hammer rod 8 and may include at least two connectors 22. A rod hole 24 may be fashioned in each connector 22 through which the hammer rod 8 may pass. A connector interstitial area 26 may be positioned between adjacent connectors 22. Among other advantages, including but not limited to increased turbulence within the hammermill assembly 2 in certain applications, spacing connectors 22 apart from one another dispenses with the need for spacers 8a, as required by the prior art.

The contact portion 40 generally may be configured for contact with a material to be comminuted within the hammermill assembly 2 and includes at least one contact member 42. The embodiment in FIGS. 5-7D may include four contact members 4, wherein a contact interstitial area 46 may be positioned between adjacent contact members 42. At the distal end of each contact member 42 may be a primary contact surface 44, which may have a hardened edge. The hardened edge may be applied via heat treating, welding, infusion, or any other method known or unknown without limiting the scope of the multi-connector hammer 10. Additionally, the primary contact surface 44 may be composed of any suitable material, known or unknown.

Figures 7A, 7B:
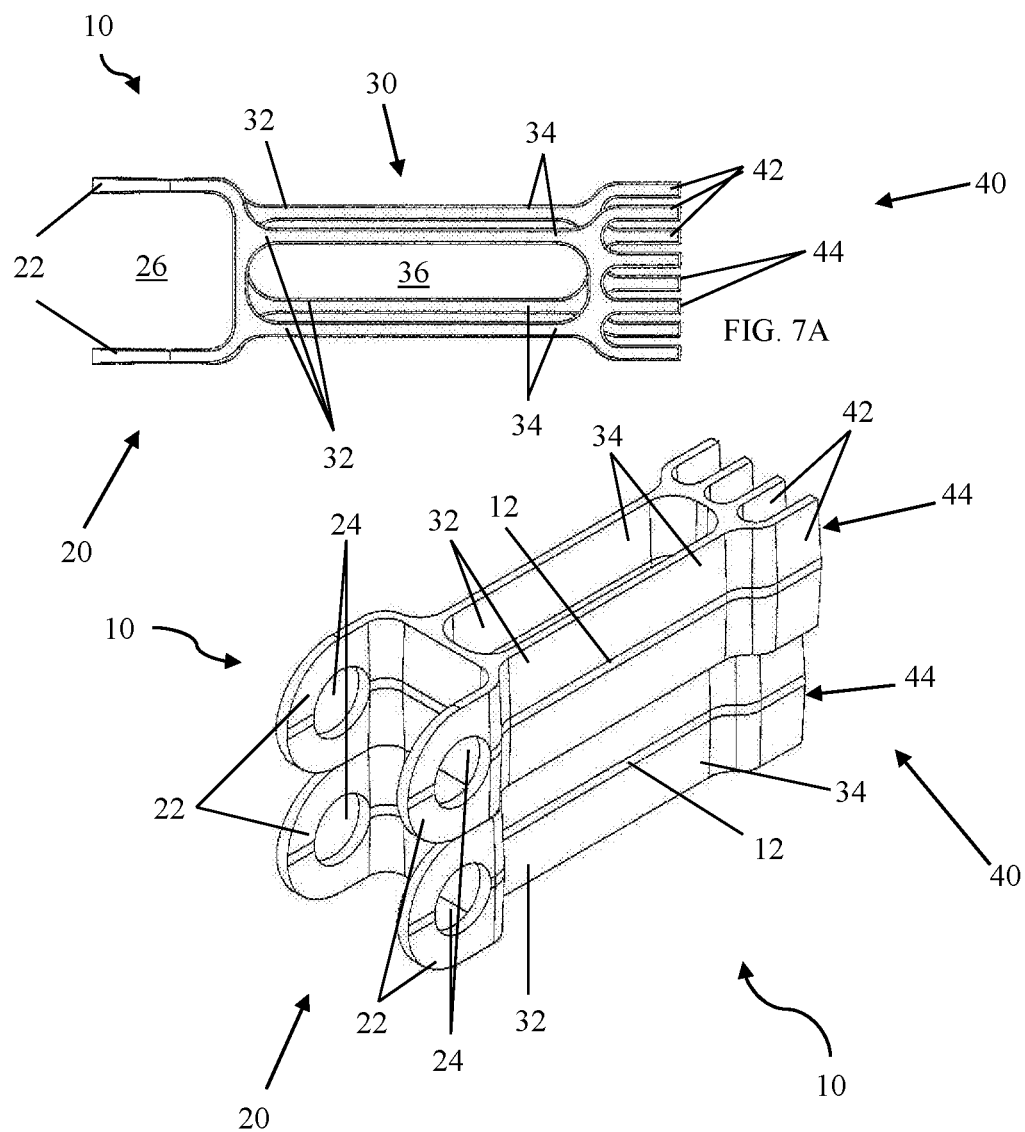
FIGS. 7B, 8B, 10B, 18B, 21A, 22A, 23A, 24A, and 25A are shown to scale.
FIG. 7A provides a top view of two multi-connector hammers according to the first embodiment thereof positioned vertically with respect to one another.
Figure 7C:
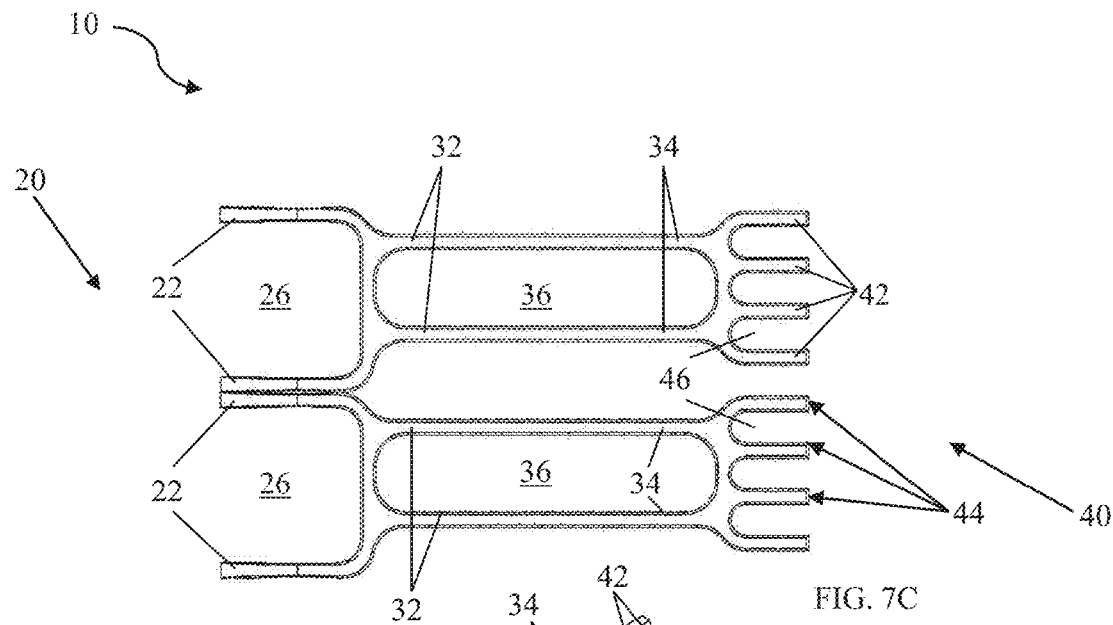
FIG. 7C provides a top view of two multi-connector hammers according to the first embodiment thereof positioned horizontally with respect to one another.
Figure 7D:
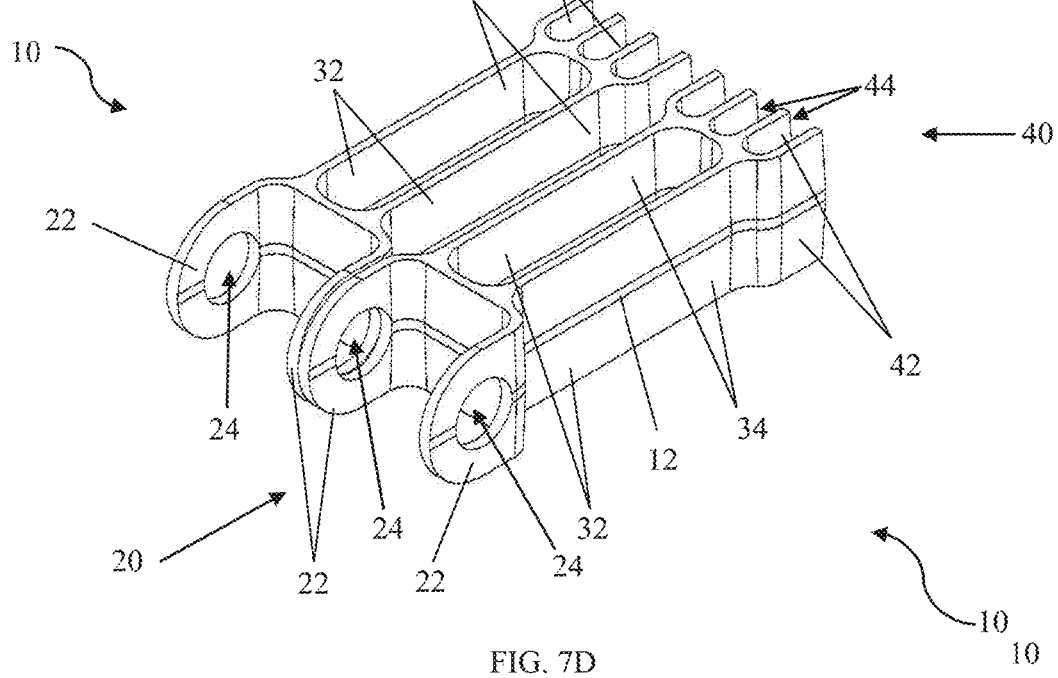
FIG. 7D provides a perspective view of two multi-connector hammers according to the first embodiment thereof positioned horizontally with respect to one another.
Figure 8A:
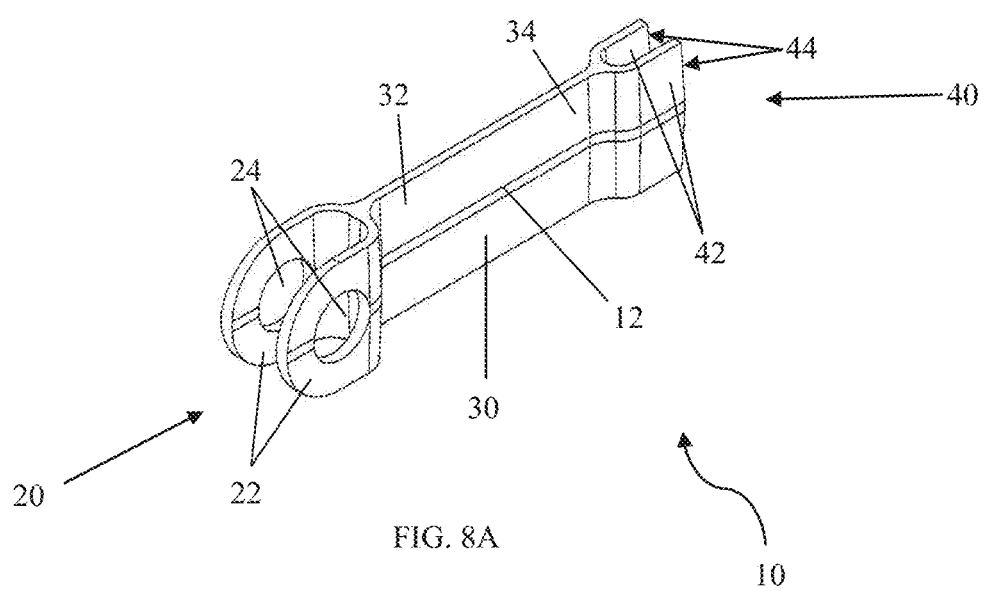
FIG. 8A provides a perspective view of a second embodiment of a multi-connector hammer.
Figure 8B:
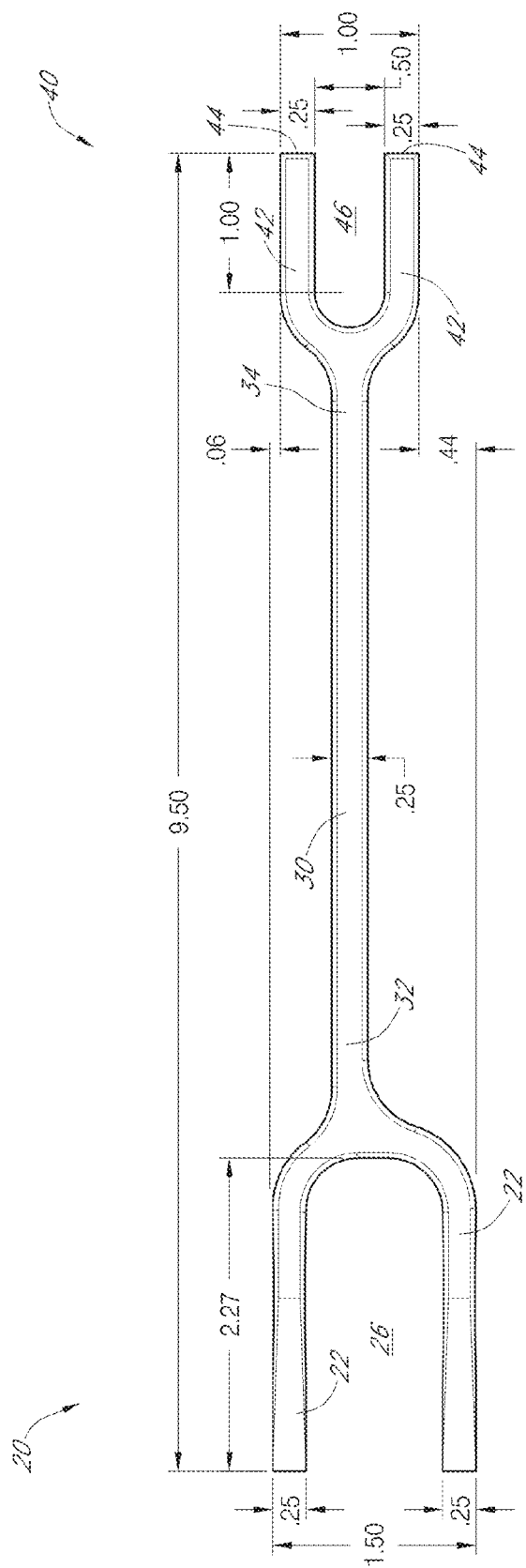
Figure 9A:
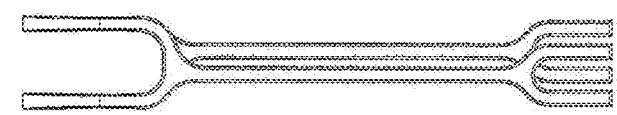
FIG. 9A provides top view of two multi-connector hammers according to the second embodiment thereof positioned vertically with respect to one another.
Figure 9B:
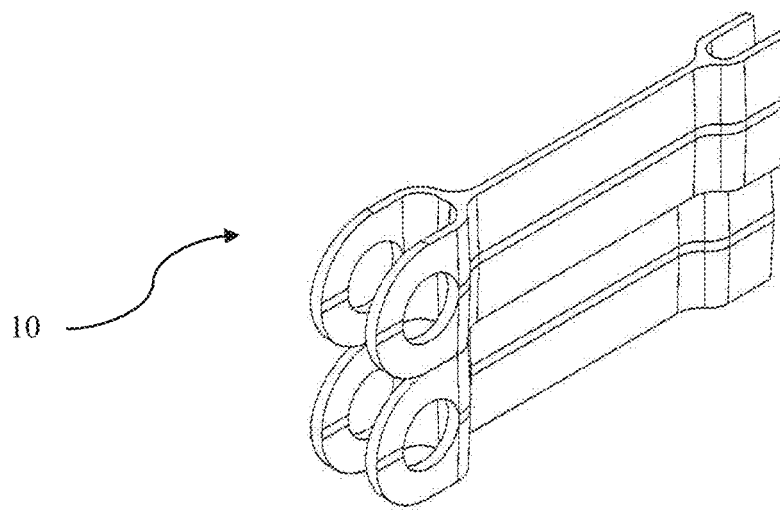
FIG. 9B provides a perspective view of the multi-connector hammers shown in FIG. 9A.
Figure 9C:
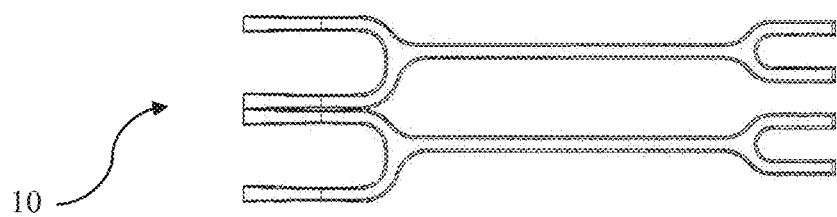
FIG. 9C provides a top view of two multi-connector hammers according to the second embodiment thereof positioned horizontally with respect to one another.
Figure 9D:
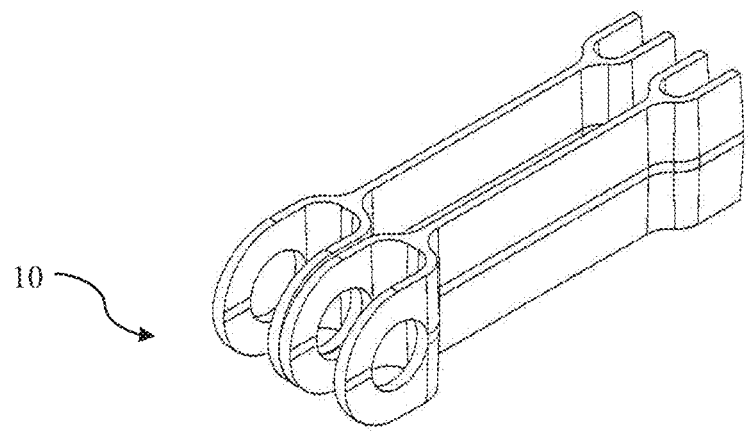
FIG. 9D provides a perspective view of the multi-connector hammers shown in FIG. 9C.
Figure 10A:
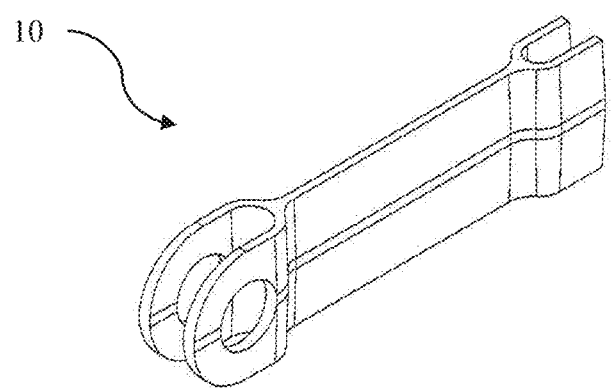
FIG. 10A provides a perspective view of a third embodiment of a multi-connector hammer.
Figure 10B:
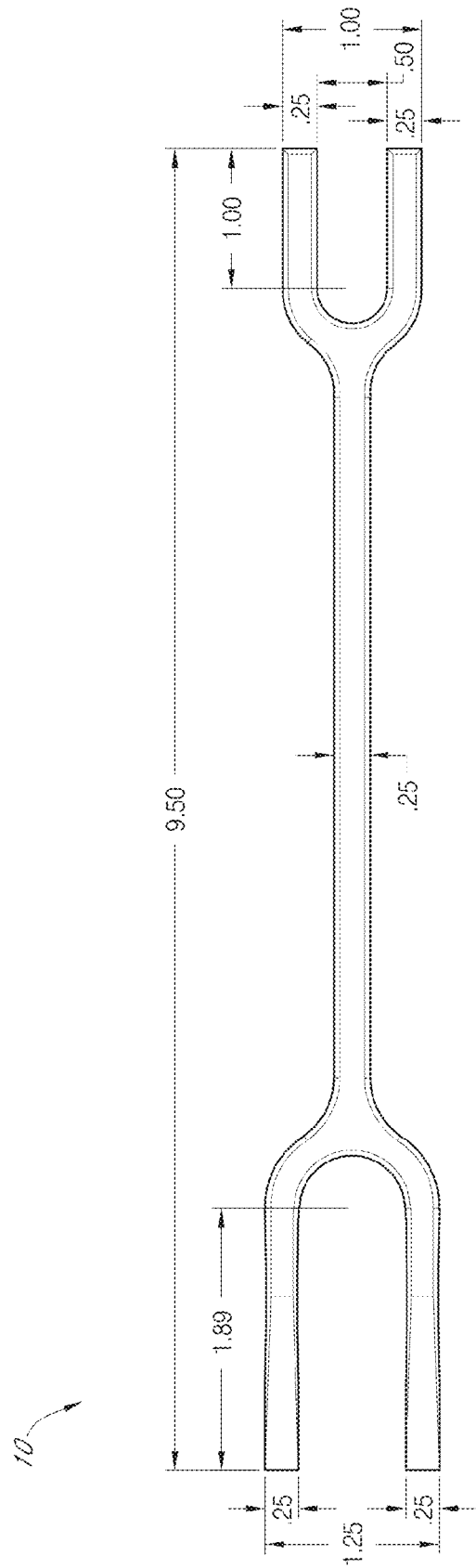
Figure 10C:
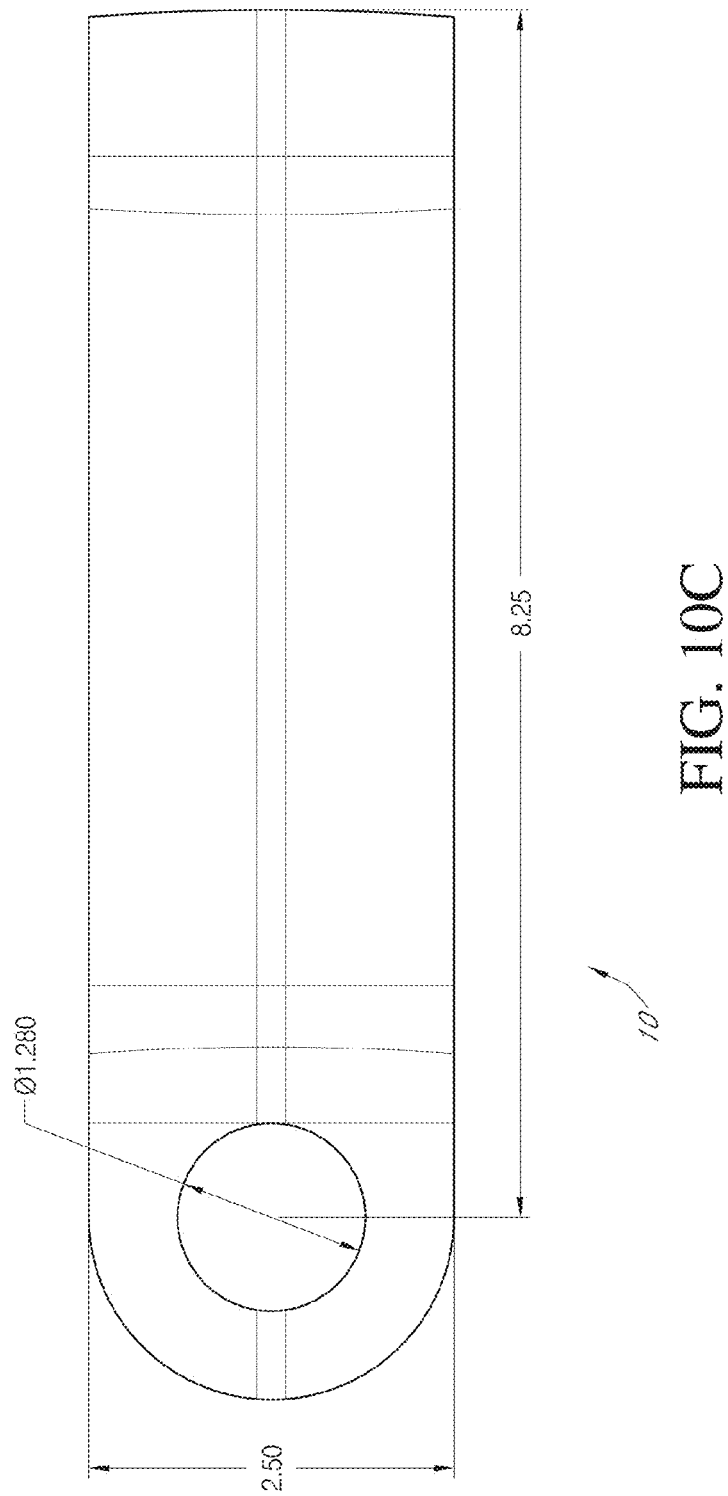
FIG. 10C provides a side view of the third embodiment of a multi-connector hammer.

As shown in FIG. 6A, the necks 30 in the first embodiment of the multi-connector hammer 10 may be asymmetrical with respect to the connection portion 20 and/or contact portion 40. Furthermore, as shown in FIG. 8B, the neck 30 in the second embodiment of the multi-connector hammer 10 also may be asymmetrical with respect to the connection portion 20 and/or contact portion 40. The optimal configuration/orientation of the neck(s) 30 with respect to the connection portion 20 and/or contact portion 40 may vary depending on at least the material to be comminuted. Certain configurations/orientations may allow for more or less turbulence within the hammermill assembly 2. Additionally, asymmetrical configurations such as those shown in FIGS. 5-9D allow for offsetting the necks 30 of adjacent multi-connector hammers 10 as best shown in FIGS. 7A & 9A.

Figure 19A:
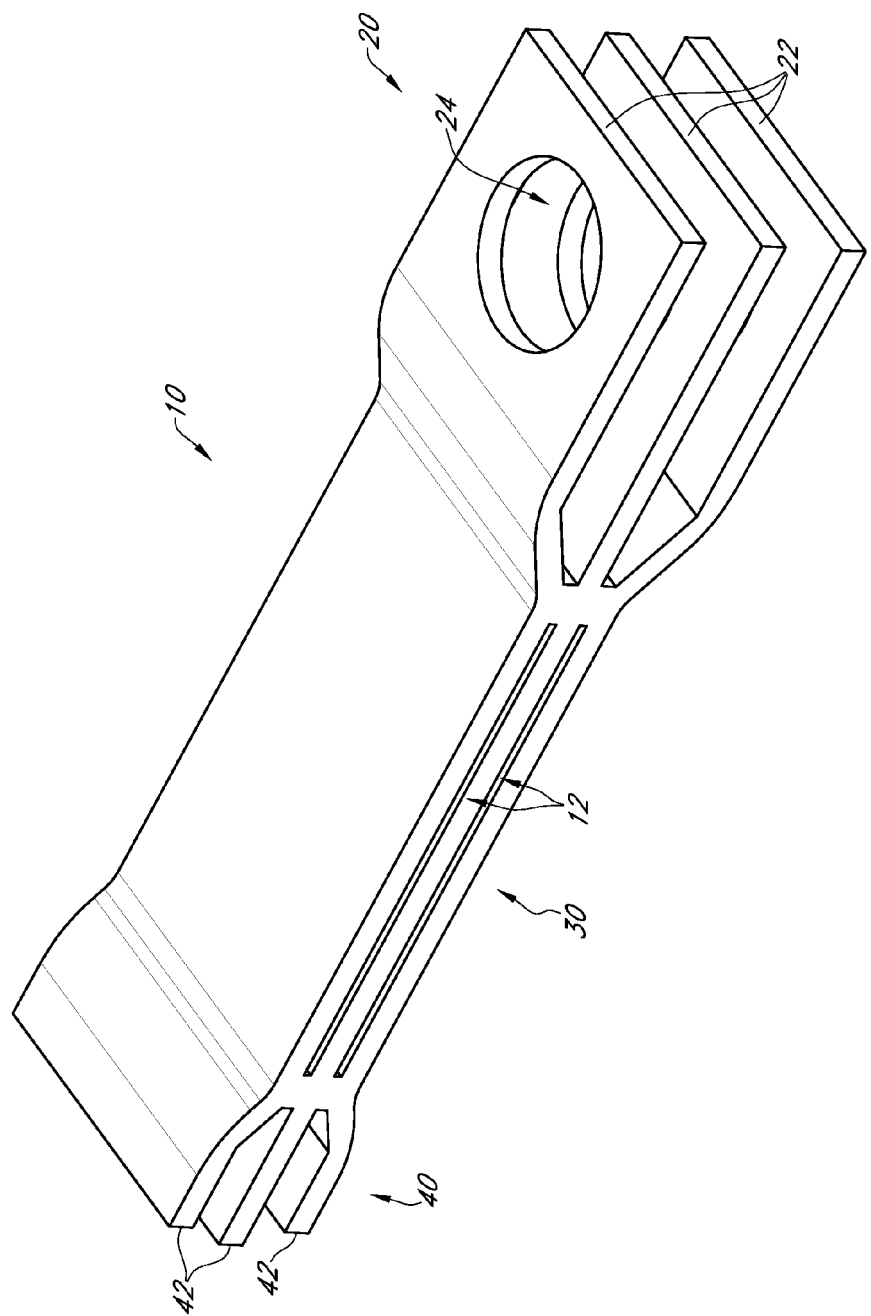
FIG. 19A provides a perspective view of a fifth embodiment of a multi-connector hammer.
Figure 19B:
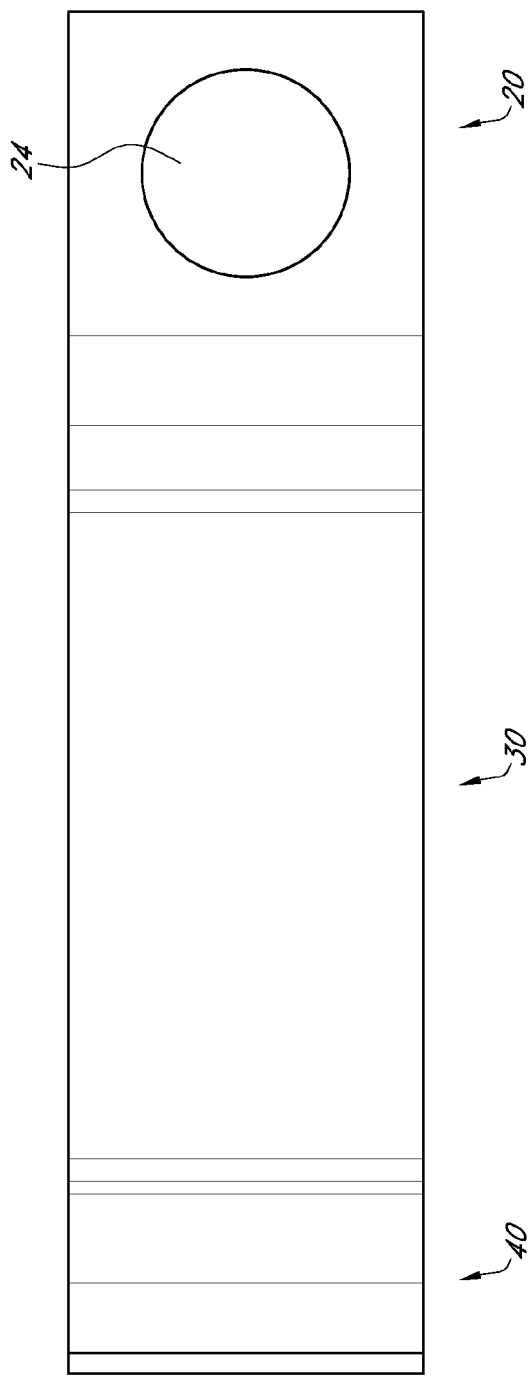
FIG. 19B provides a side view of the embodiment of a multi-connector hammer shown in FIG. 19A.
Figure 19C:
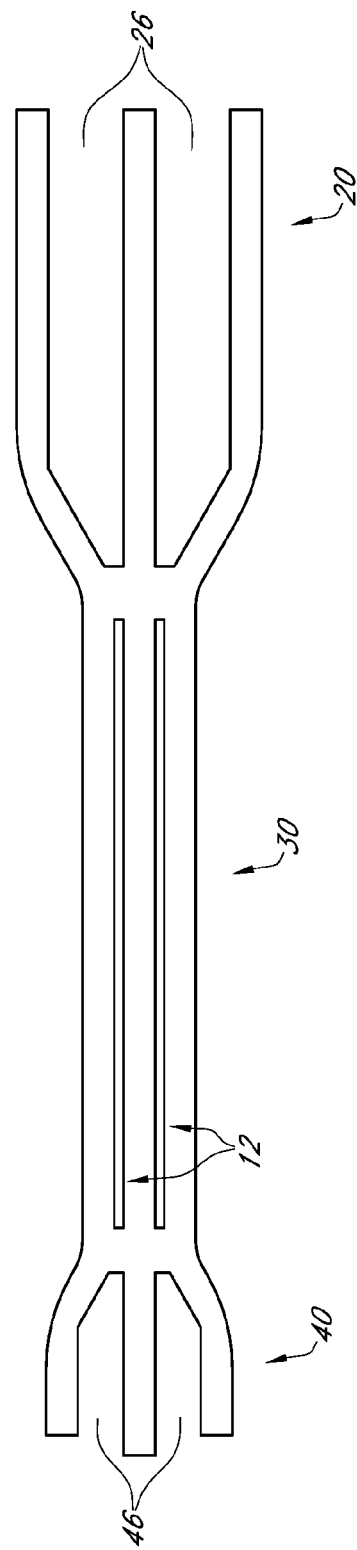
FIG. 19C provides a top view of the embodiment of a multi-connector hammer shown in FIG. 19A.

A third embodiment of a multi-connector hammer 10 is shown in FIGS. 19A-19C. As best shown in FIGS. 19A & 19C, this embodiment includes three connectors 22 and three contact members 42. It is contemplated that this embodiment of the multi-connector hammer 10 will be relatively easy and inexpensive to manufacture. As clearly shown in FIGS. 19A and 19C, each connector 22 and corresponding contact member 42 and neck 32 may be formed as a unitary piece, wherein three unitary pieces are affixed to one another to produce the multi-connector hammer 10 shown in FIGS. 19A-19C. A seam 12 may be positioned between the unitary pieces. Each unitary piece may be stamped from a sheet of material and then joined together at a seam 12. The rod hole 24 in each connector 22 may be heat treated for hardness. As with the previous embodiments, the third embodiment dispenses with the need for spacers 8a in most applications.

Figure 20A:
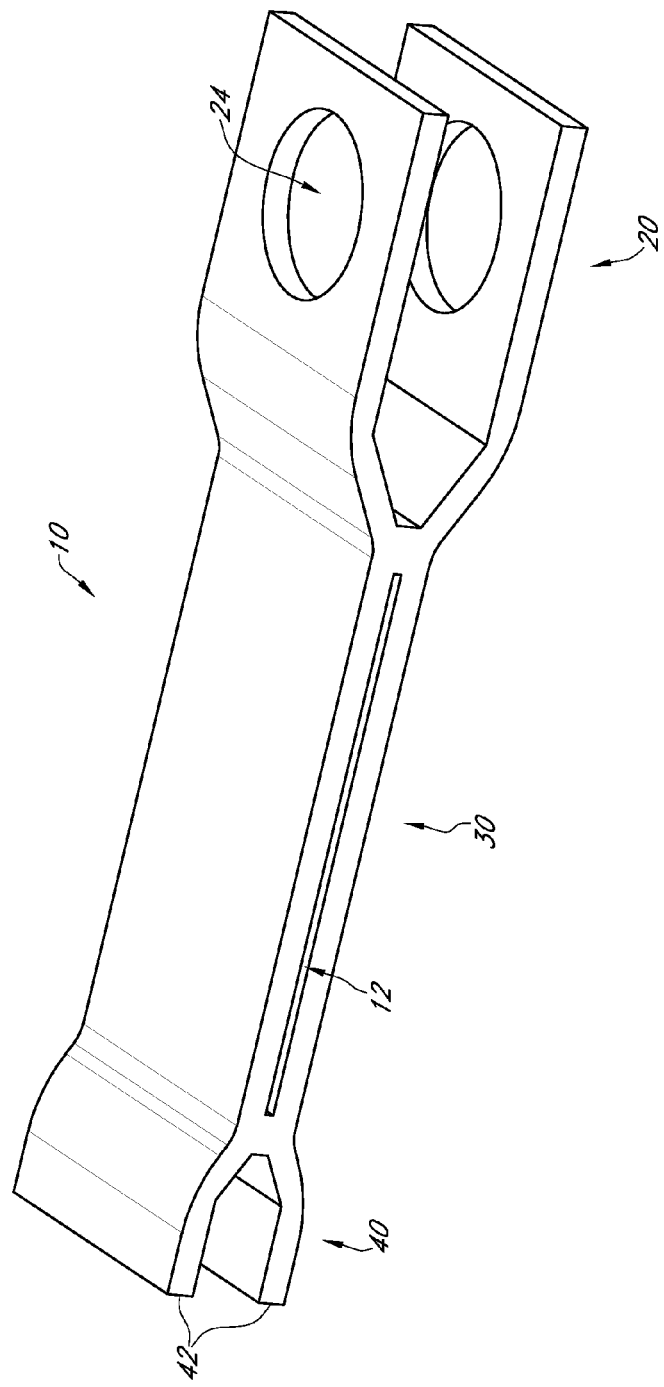
FIG. 20A provides a perspective view of a sixth embodiment of a multi-connector hammer.
Figure 20B:
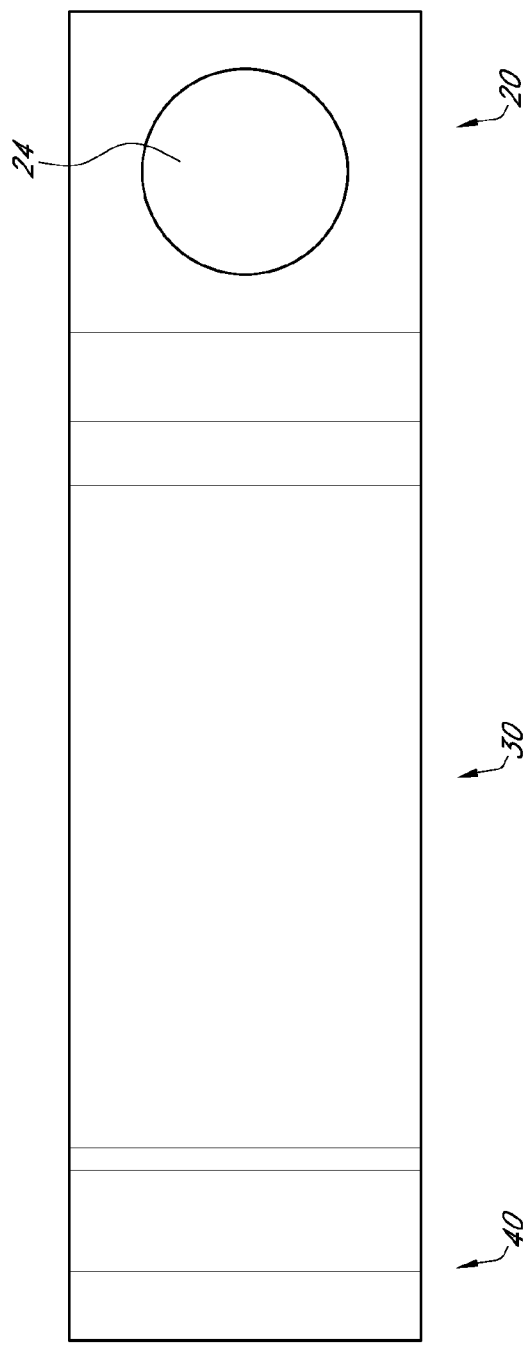
FIG. 20B provides a side view of the embodiment of a multi-connector hammer shown in FIG. 20A.
Figure 20C:
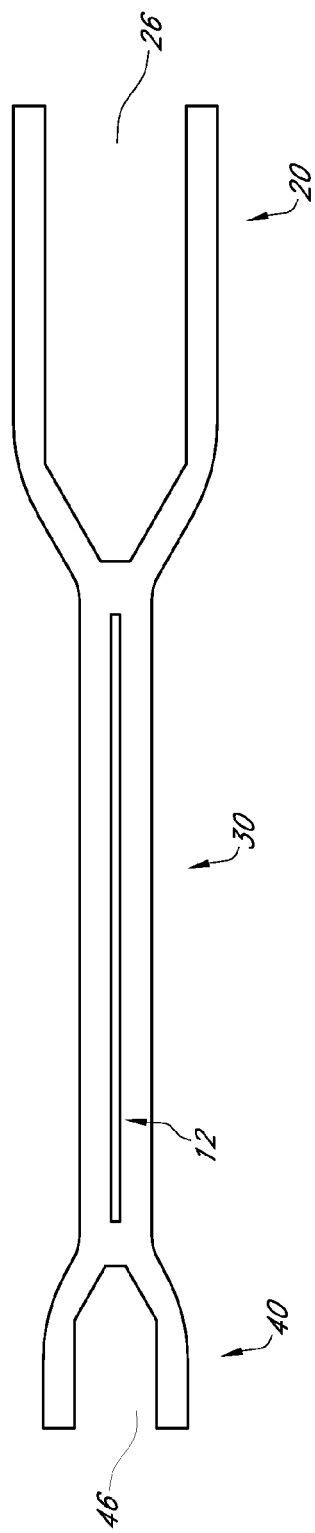
FIG. 20C provides a top view of the embodiment of a multi-connector hammer shown in FIG. 20A.

A fourth embodiment of a multi-connector hammer 10 is shown in FIGS. 20A-20C. The fourth embodiment includes two connectors 22 and two contact members 42. As a corollary to the third embodiment, it is contemplated that each connector 22 and corresponding contact member 42 and neck may be formed as a unitary piece, wherein two unitary pieces are affixed to one another to produce the fourth embodiment of the multi-connector hammer 10. A seam 12 may be positioned between the unitary pieces. Each unitary piece may be stamped from a sheet of material and then joined together at a seam 12. The rod hole 24 in each connector 22 may be heat treated for hardness. As with the previous embodiments, the fourth embodiment dispenses with the need for spacers 8a in most applications.

Both the third and fourth embodiments of the multi-connector hammer 10 may be formed from unitary pieces having different thicknesses. For example, the material may be ¼ inches thick for one application and ⅜ inches thick for another. Typically, the narrower the thickness of the material used in the multi-connector hammer 10, the finer the grind of the material. Accordingly, the optimal thickness of each unitary piece will vary from one application of the multi-connector hammer 10 to the next, and is in no way limited to the scope thereof.

3. Illustrative Embodiment of a Protective Arm

FIGS. 11-18 show various view of an illustrative embodiment of a protective arm 50, which may be used with various different hammermill assemblies 2. It is contemplated that the illustrative embodiment of the protective arm 50 will be especially useful in rotating hammermill assemblies 2, but it may be used in other applications as well. Furthermore, different embodiments of the protective arm 50 may be used with equipment other than rotating hammermill assemblies 2.

As shown, the protective arm 50 may be engaged with a hammer rod 8 via an arm rod hole 52a, which may be positioned in an arm connection portion 52. The arm connection portion 52 is formed as a loop in the embodiment of the protective arm 50 shown herein, but may be differently configured in other embodiments. An arm spacer portion 54 may be connected to an integrally formed with the arm connection portion 52. The protective arm 50 may terminate at an arm distal end 56.

Figure 14:
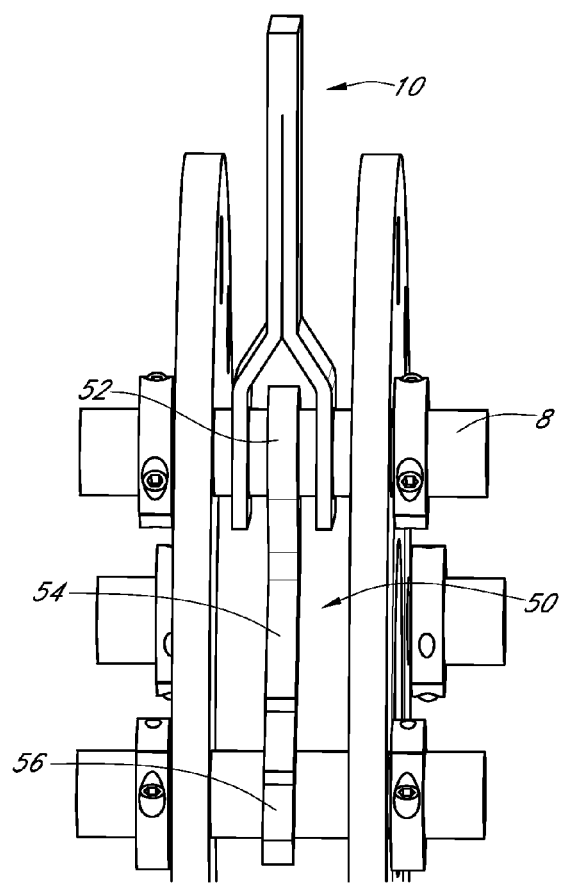
FIG. 14 provides a detailed view of the first embodiment of the protective arm and the attachment thereof to the hammer rod.

As best shown in FIG. 14, the protective arm 50 may be pivotally mounted to a hammer rod 8 on which a multi-connector hammer 10 is also mounted. The arm connection portion 52 may be positioned on the hammer rod 8 between two connectors 22 of the multi-connector hammer 10.

Figure 11:
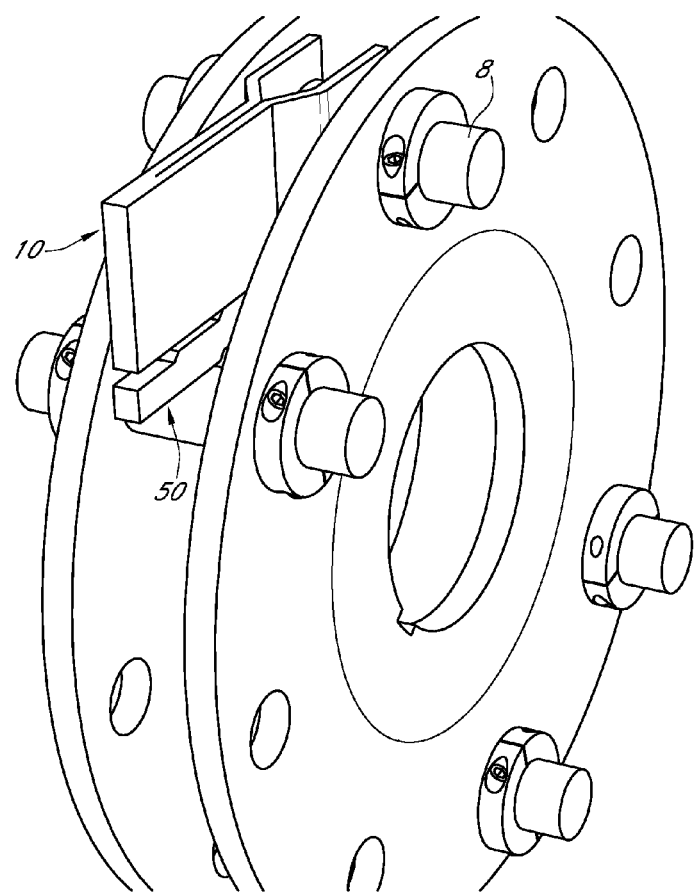
FIG. 11 provides a perspective view of a first embodiment of a protective arm and a fourth embodiment of a multi-connector hammer engaged with a hammer rod.

The dimensions of the arm connection portion 52, arm spacer portion 54, and arm distal end 56 may be chosen such that the protective arm 50 prevents one surface of the multi-connector hammer 10 from contacting the adjacent hammer rod 8, as best shown in FIG. 11. Accordingly, if the multi-connector hammer 10 contacts an object during operation that causes the multi-connector hammer 10 to recoil, the protective arm 50 prevents damage to the trailing edge of the multi-connector hammer 10 by shielding it from direct contact with the hammer rod 8.

Figure 12:
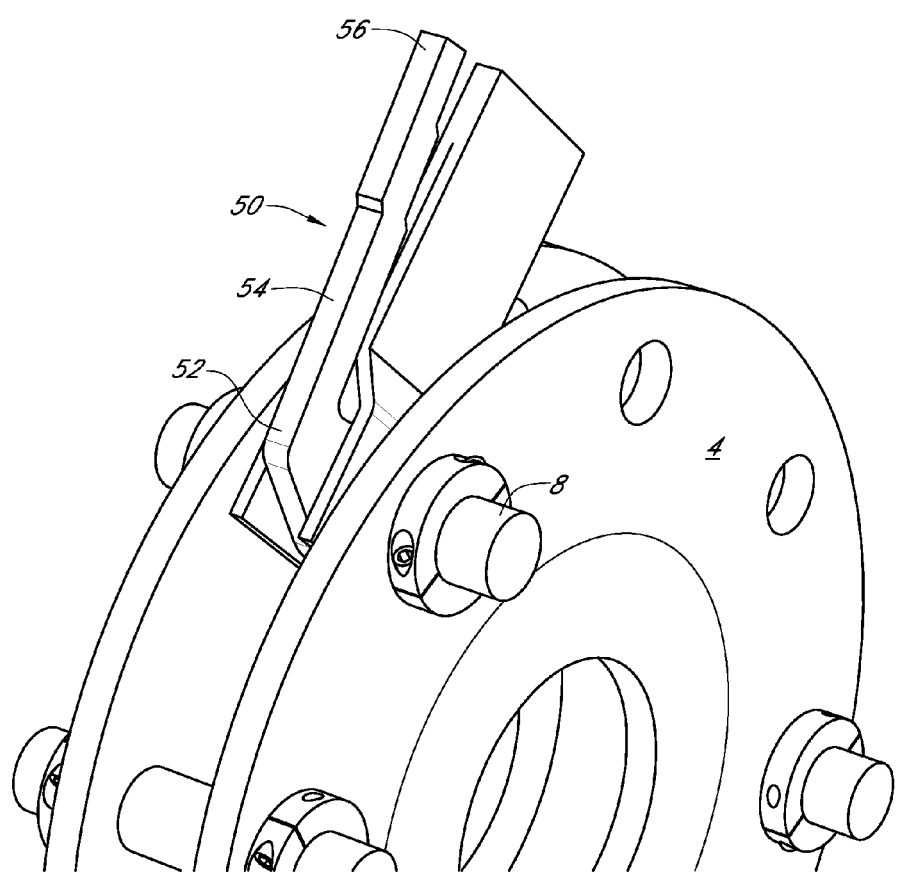
FIG. 12 provides a detailed view of the embodiment of the protective arm and multi-connector hammer shown in FIG. 11.
Figure 13:
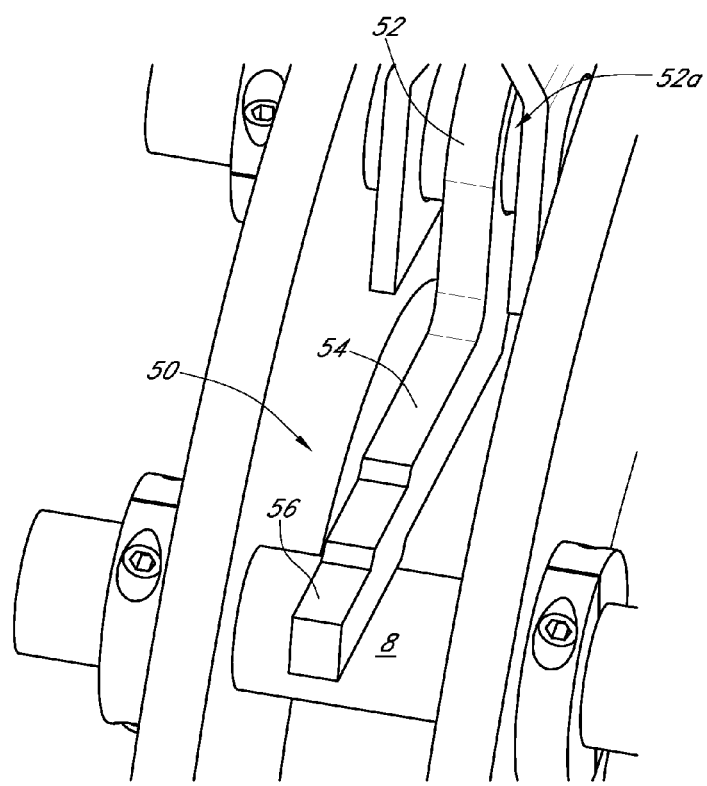
FIG. 13 provides a detailed view of one side of the first embodiment of the protective arm.
Figure 15:
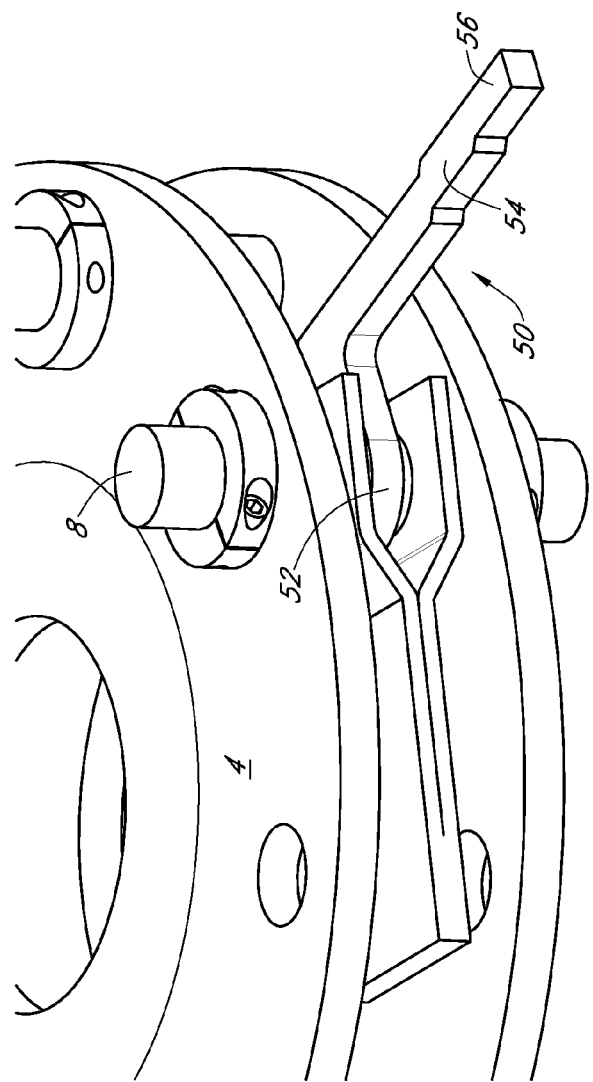
FIG. 15 provides a detailed view of another side of the first embodiment of the protective arm.
Figure 16:
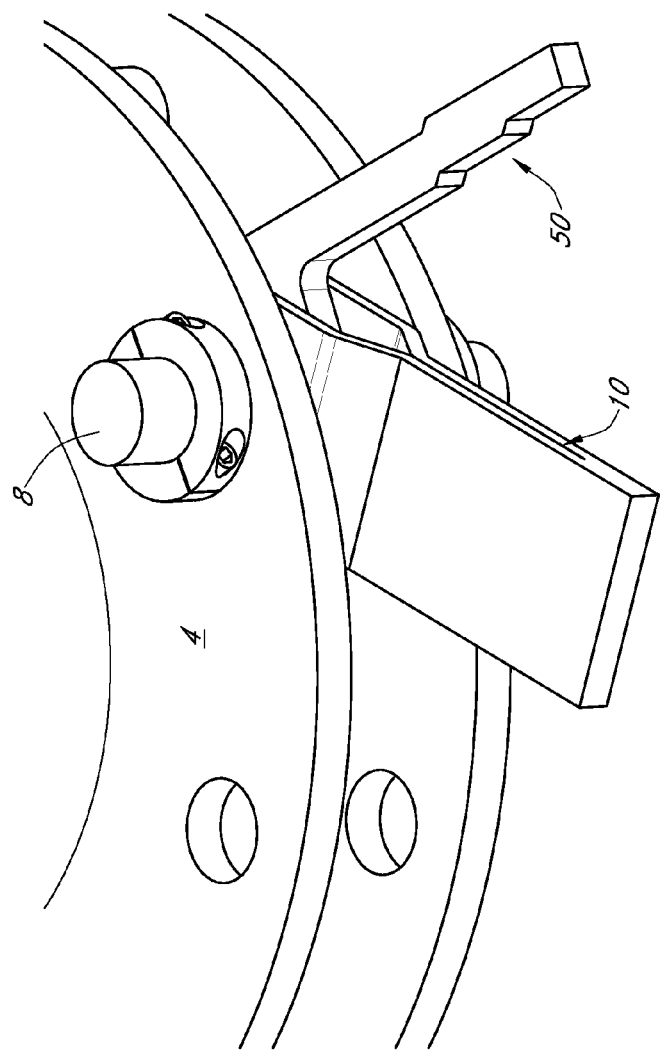
FIG. 16 provides another detailed view of the first embodiment of the protective arm and fourth embodiment of a multi-connector hammer.
Figure 17:
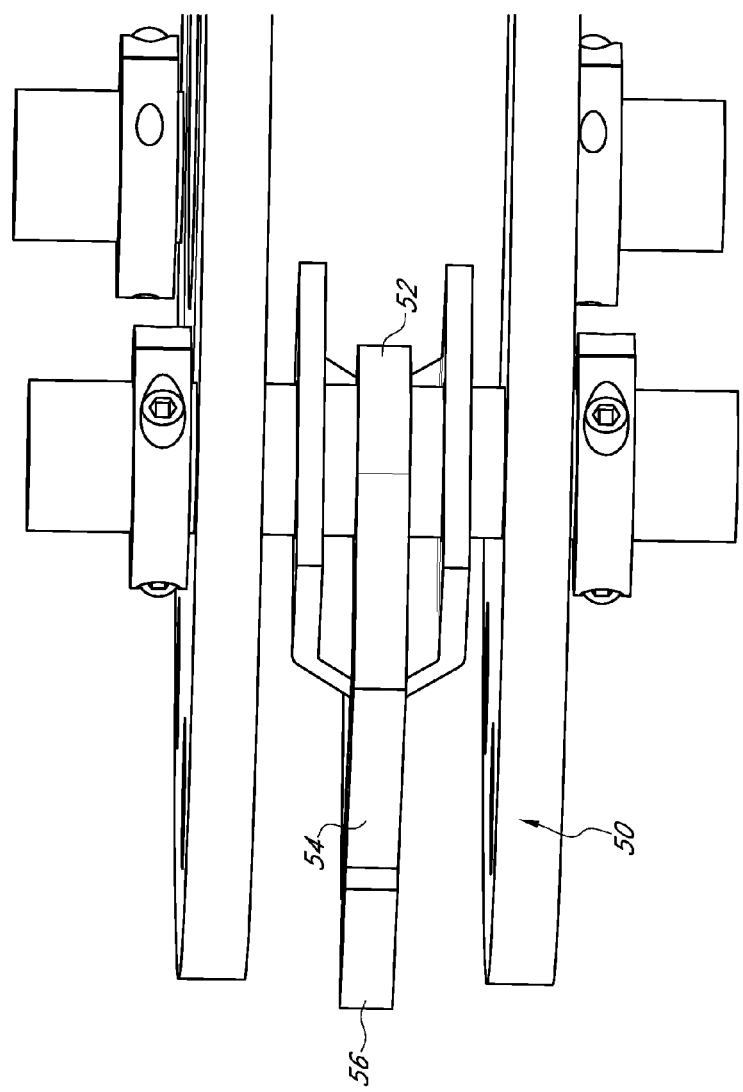
FIG. 17 provides another detailed view of the first embodiment of the protective arm and the attachment thereof to the hammer rod.
Figure 18A:
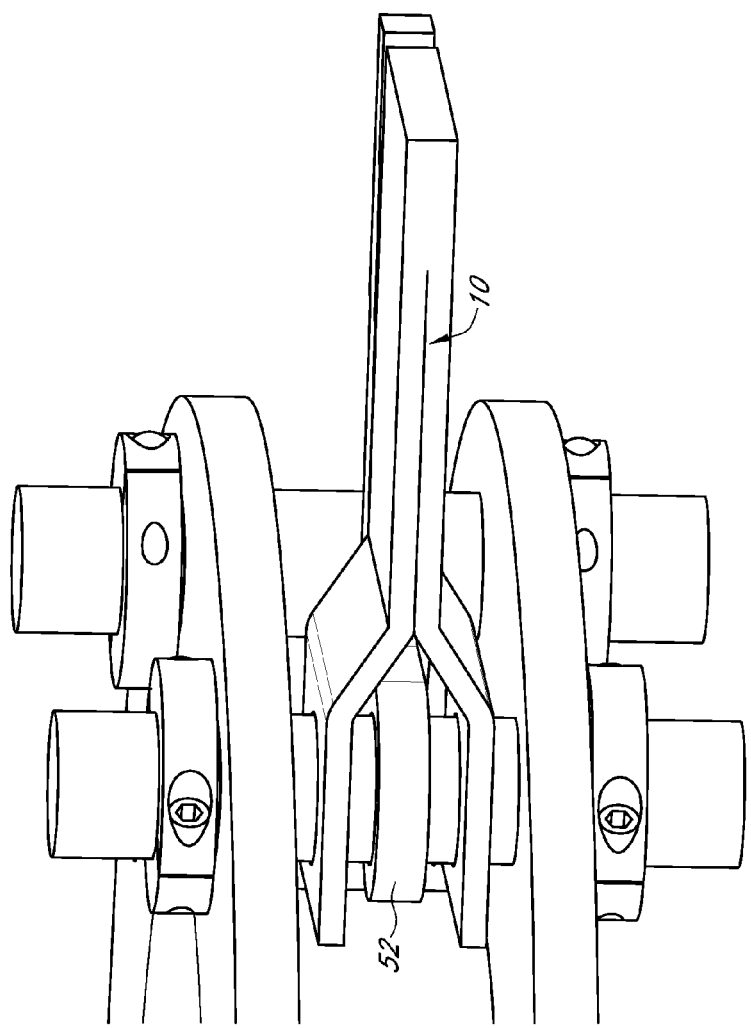
FIG. 18A provides yet another detailed view of the first embodiment of the protective arm and the attachment thereof to the hammer rod.
Figure 18B:
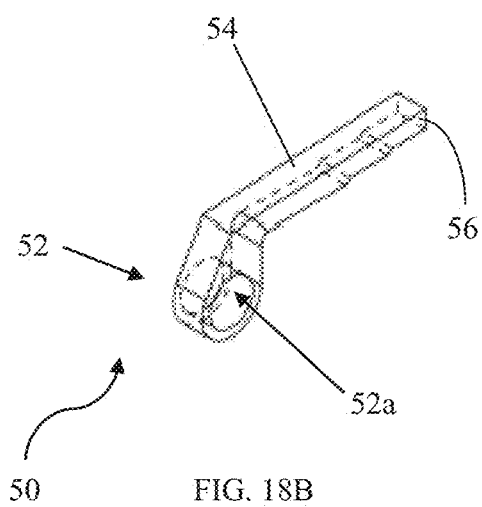
Figure 18C:
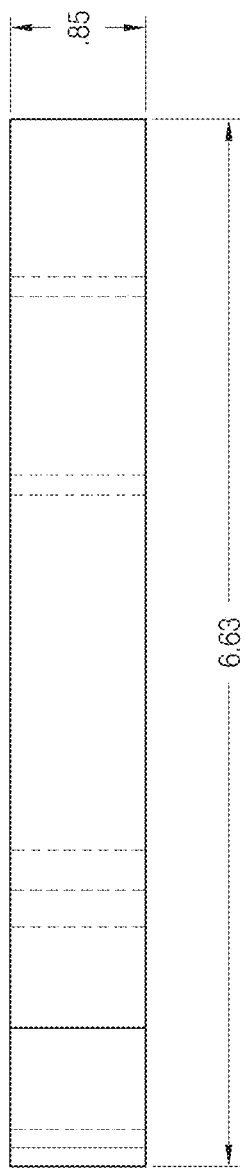
FIG. 18C provides a top view of the first embodiment of the protective arm.
Figure 18D:
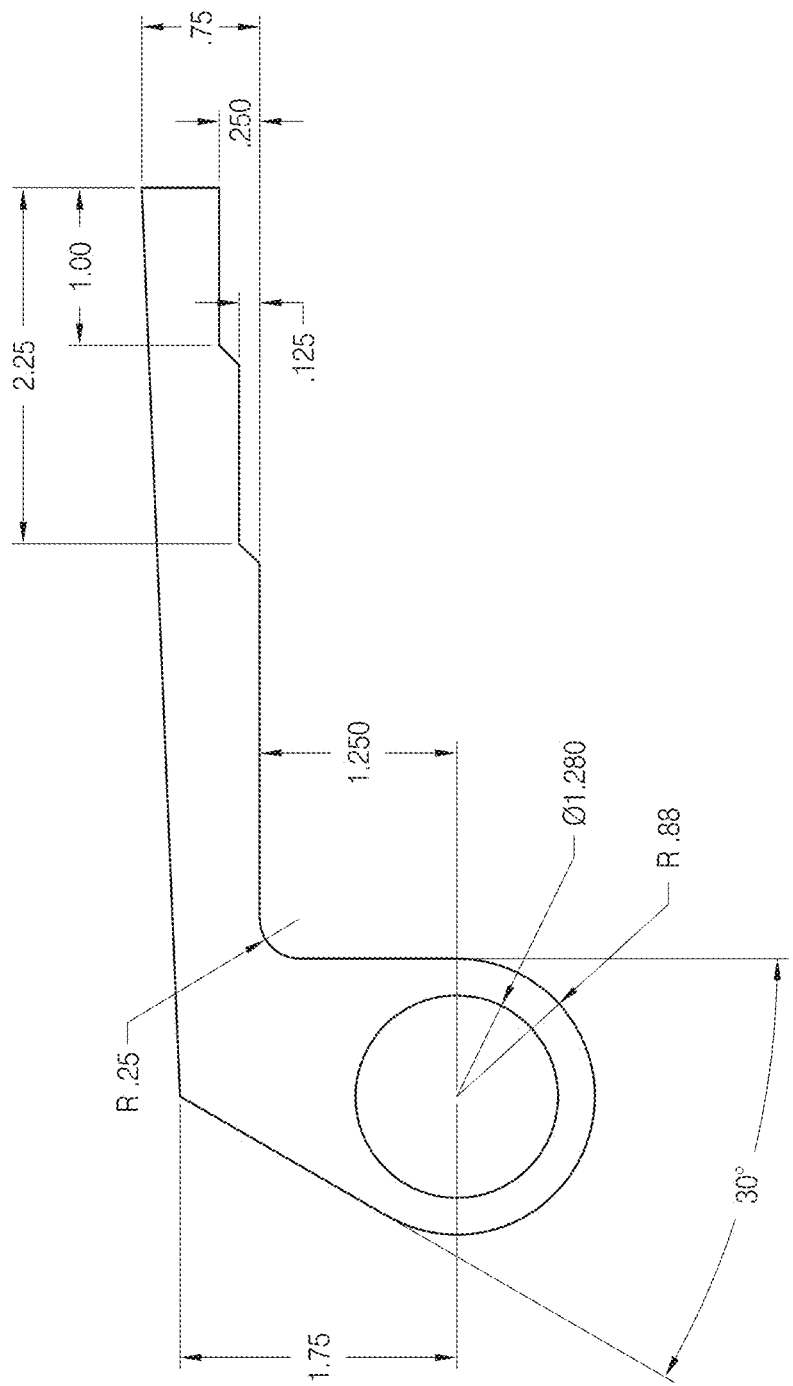
FIG. 18D provides a side view of the first embodiment of the protective arm.

The arm spacer portion 54 and arm distal end 56 may be offset from the arm rod hole 52a, as best shown in FIG. 15. This allows the multi-connector hammer 10 to function normally under typical conditions. Furthermore, this allows the multi-connector hammer 10 to recoil almost as far when used in conjunction with the protective arm 50 as when not, which is best shown in FIG. 11. Furthermore, this configuration of the protective arm 50 allows the protective arm 50 to be situated immediately adjacent the multi-connector hammer 10 during normal operation of the hammermill assembly 2, as best shown in FIG. 12. However, in other embodiments of the protective arm 50, the arm spacer portion 54 and arm distal end 56 may be oriented differently with respect to the arm connection portion 52.

Figure 21A:
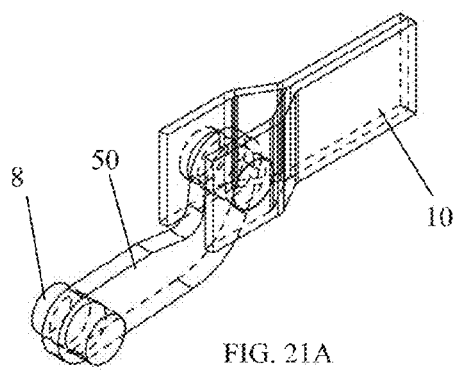
Figure 21B:
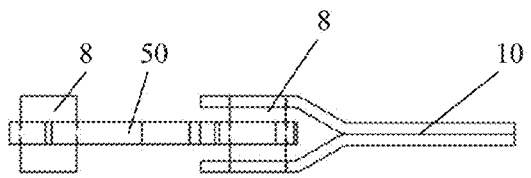
FIG. 21B provides a top view of the protective arm and multi-connector hammer from FIG. 21A.
Figure 21C:
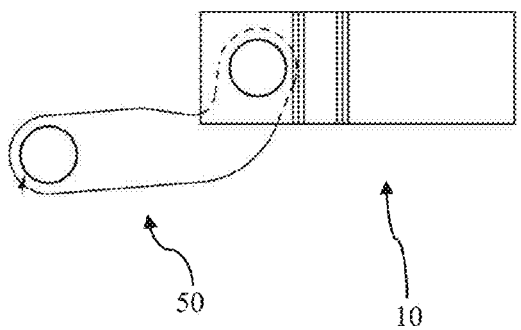
FIG. 21C provides a side view of the protective arm and multi-connector hammer from FIG. 21A FIG. 22A provides perspective view of the embodiment of the multi-connector hammer shown in FIG. 21A.
Figure 22A:
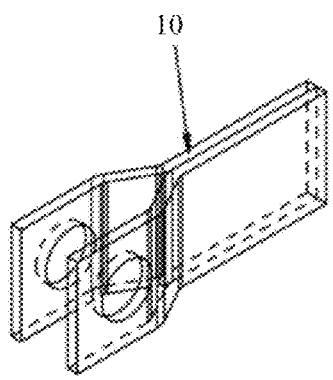
Figure 22B:
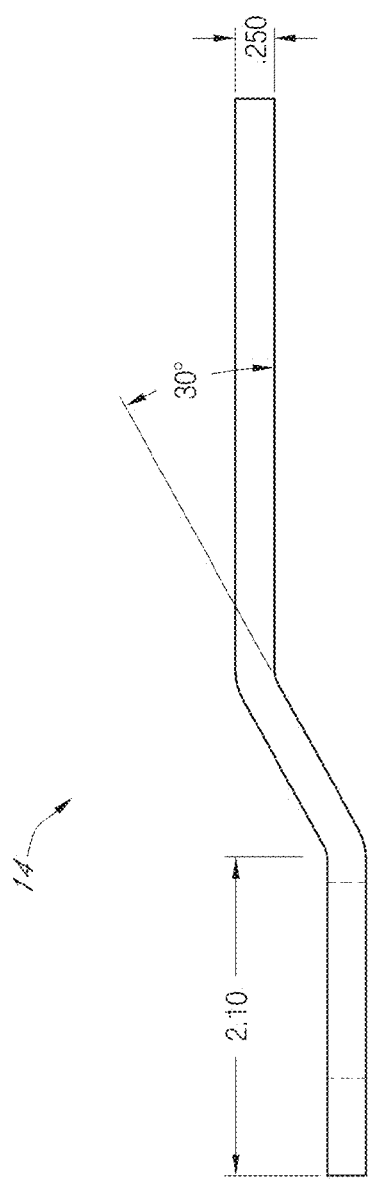
FIG. 22B provides a top view of a half member of the multi-connector hammer shown in FIG. 21.
Figure 22C:
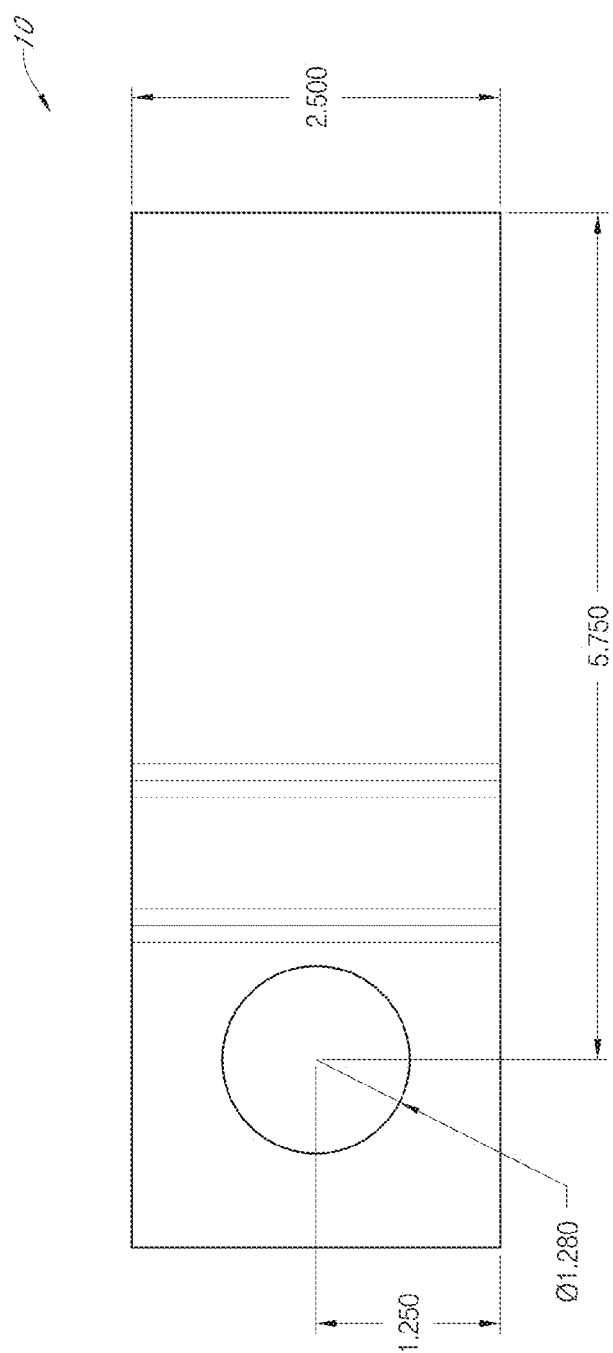
FIG. 22C provides a side view of the multi-connector hammer shown FIG. 22A
Figure 23B:
FIG. 23B provides a top view of the second embodiment of a protective arm.
Figure 23:
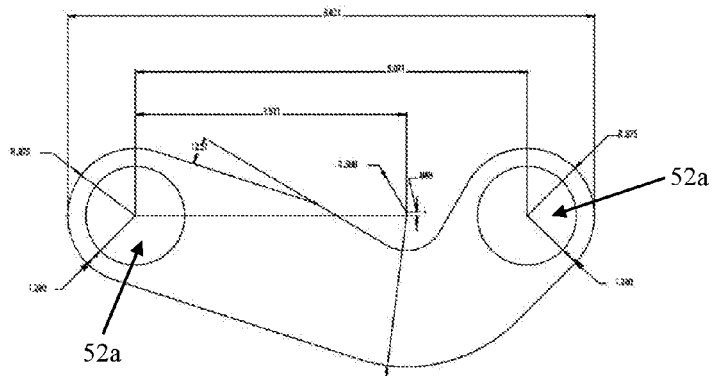
FIG. 23C provides a side view of the second embodiment of a protective arm.
Figure 23A:
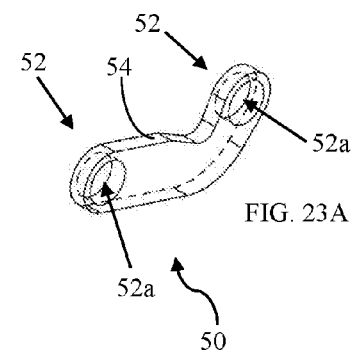
Figure 24B:
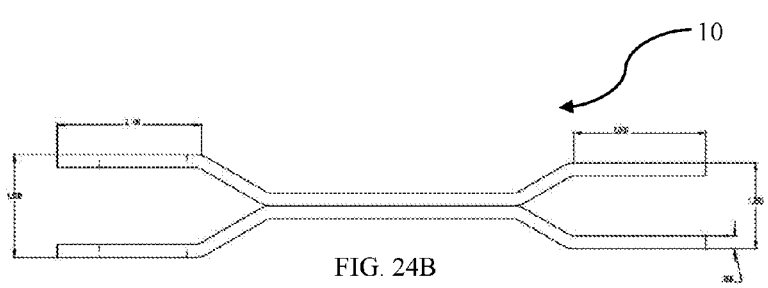
FIG. 24B provides a top view of the embodiment of a multi-connector hammer shown in FIG. 24A.
Figure 24C:
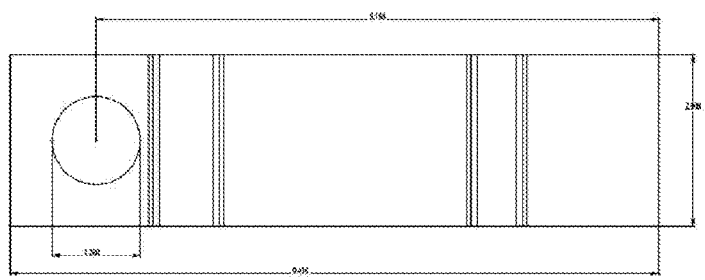
FIG. 24C provides a side view of the embodiment of a multi-connector hammer shown in FIG. 24A.
Figure 24A:
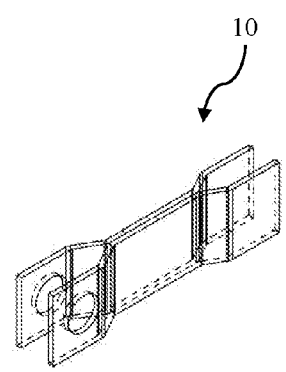
Figure 25A:
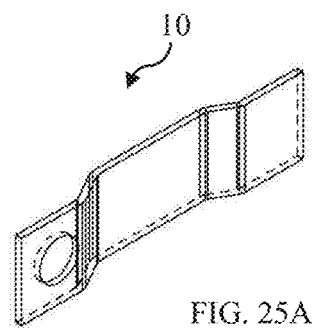
Figure 25B:
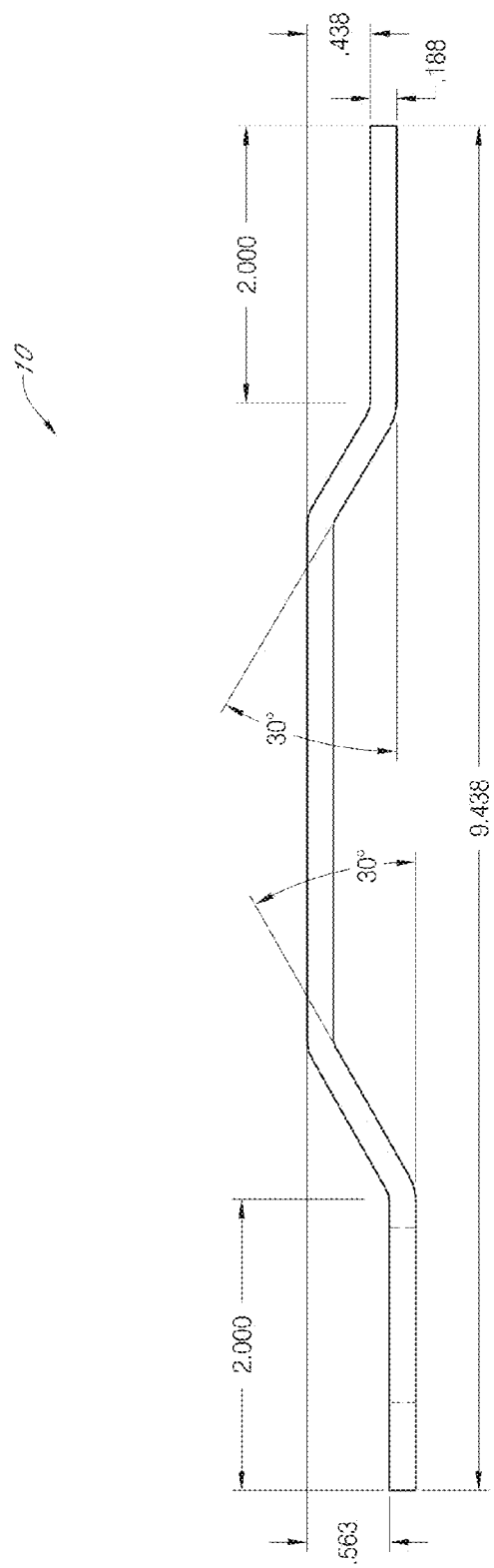
FIG. 25B provides a top view of the half member shown in FIG. 25A.
Figure 25C:
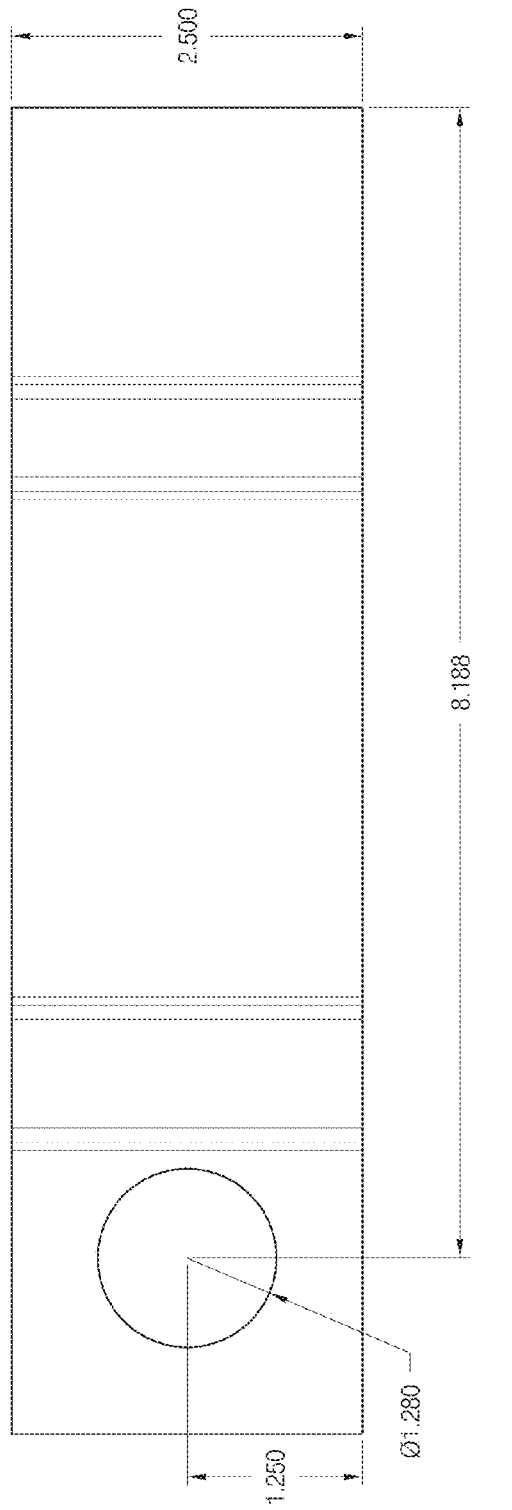
FIG. 25C provides a side view of the half member shown in FIG. 25C.

A second embodiment of a protective arm 50 that may be used with a hammermill assembly 2 is shown adjacent a multi-connector hammer 10 in FIG. 21 and alone in FIG. 23. The second embodiment of the protective arm 50 includes two arm connection portions 52 at either end thereof, wherein each arm connection portion 52 is formed with an arm rod hole 52a therein. An arm spacer portion 54 is positioned between the two arm connection portions 52. Adjacent hammer rods 8 in a hammermill assembly 2 may be positioned in the two arm rod holes 52a of the second embodiment of the protective arm 52. Accordingly, it is estimated that the second embodiment of the protective arm 50 will require less material and/or horsepower than the first embodiment thereof.

During use, the multi-connector hammer 10 engaged with the hammer rod 8 adjacent a first arm connection portion 52 (as shown in FIG. 21) may pivot counterclockwise as shown in FIG. 21 when the multi-connector hammer 10 encounters an obstruction of sufficient magnitude. The neck 30 of the multi-connector hammer 10 may then contact the protective arm 50 at the arm spacer portion 54, which prevents damage to the non-leading edge of the contact portion 40.

The materials used to construct the connection portion 20, neck 30, and contact portion 40 will vary depending on the specific application for the multi-connector hammer 10. Certain applications will require a high tensile strength material, such as steel, while others may require different materials, such as carbide-containing alloys. Accordingly, the above-referenced elements may be constructed of any material known to those skilled in the art, which material is appropriate for the specific application of the multi-connector hammer 10, without departing from the spirit and scope of the multi-connector hammer 10 as disclosed and claimed herein.

Other methods of using the multi-connector hammer 10 and embodiments thereof will become apparent to those skilled in the art in light of the present disclosure. Accordingly, the methods and embodiments pictured and described herein are for illustrative purposes only. The multi-connector hammer 10 also may be used in other manners, and therefore the specific hammermill assembly 2 in which the multi-connector hammer 10 is used in no way limits the scope of the multi-connector hammer 10.

It should be noted that the multi-connector hammer 10 is not limited to the specific embodiments pictured and described herein, but is intended to apply to all similar multi-connector hammers 10. Modifications and alterations from the described embodiments will occur to those skilled in the art without departure from the spirit and scope of the multi-connector hammer 10.

The materials used to construct the arm connection portion 52, arm spacer portion 54, and arm distal end 56 will vary depending on the specific application for the protective arm 50. Certain applications will require a high tensile strength material, such as steel, while others may require different materials, such as carbide-containing alloys. Accordingly, the above-referenced elements may be constructed of any material known to those skilled in the art, which material is appropriate for the specific application of the protective arm 50, without departing from the spirit and scope of the protective arm 50 as disclosed and claimed herein.

Other methods of using the protective arm 50 and embodiments thereof will become apparent to those skilled in the art in light of the present disclosure. Accordingly, the methods and embodiments pictured and described herein are for illustrative purposes only. The protective arm 50 also may be used in other manners, and therefore the specific hammermill assembly 2 in which the protective arm 50 is used in no way limits the scope of the protective arm 50.

It should be noted that the protective arm 50 is not limited to the specific embodiments pictured and described herein, but is intended to apply to all similar protective arms 10 designed to extend the working life of a hammer. Modifications and alterations from the described embodiments will occur to those skilled in the art without departure from the spirit and scope of the protective arm 50.

The invention claimed is:

1. A hammermill assembly comprising:
   a. a hammermill drive shaft;
   b. an end plate, wherein said hammermill drive shaft is secured to said end plate;
   c. an interior plate, wherein said hammermill drive shaft is secured to said interior plate, and wherein said interior plate is axially spaced from said end plate;
   d. a hammer rod, wherein said hammer rod is simultaneously affixed to both said end plate and said interior plate;
   e. a multi-connector hammer pivotally engaged with said hammer rod, wherein said multi-connector hammer comprises:
      i. a connection portion, wherein said connection portion includes a first connector and a second connector;
      ii. a first rod hole positioned in said first connector;
      iii. a second rod hole positioned in said second connector;

iv. a first neck having a first and second end, said first neck first end connected to said first and second connectors;
v. a second neck having a first and second end, said second neck first end connected to said first and second connectors; and
vi. a contact portion connected to said first and second necks second ends;
f. a protective arm pivotally engaged with said hammer rod, said protective arm comprising:
i. an arm connection portion having an arm rod hole formed therein;
ii. an arm spacer portion connected to said arm connection portion; and
iii. an arm distal end connected to said arm spacer portion.

2. The hammermill according to claim 1 wherein said multi-connector hammer is further defined as being forged.

3. The hammermill according to claim 1 wherein said protective arm is further defined as being forged.

4. The hammermill according to claim 1 wherein said protective arm further comprises a second arm rod hole.

5. The hammermill according to claim 1 wherein said multi-connector hammer is further defined as being less then seven (7) inches in length.

6. The hammermill according to claim 1 wherein said protective arm is further defined as being less than seven (7) inches in length.

7. A hammermill assembly comprising:
a. a hammermill drive shaft;
b. an end plate, wherein said hammermill drive shaft is secured to said end plate;
c. an interior plate, wherein said hammermill drive shaft is secured to said interior plate, and wherein said interior plate is axially spaced from said end plate;
d. a hammer rod, wherein said hammer rod is simultaneously affixed to both said end plate and said interior plate;
e. a multi-connector hammer pivotally engaged with said hammer rod, wherein said multi-connector hammer comprises:
i. a connection portion, wherein said connection portion includes a first connector and a second connector;
ii. a first rod hole positioned in said first connector;
iii. a second rod hole positioned in said second connector;
iv. a first neck having a first and second end, said first neck first end connected to said first and second connectors;
v. a second neck having a first and second end, said second neck first end connected to said first and second connectors;
vi. an interstitial area positioned between said first and second necks; and,
vii. a contact portion connected to said first and second necks second ends, wherein said contact portion is further defined as comprising a plurality of contact members, wherein each contact member includes a primary contact surface;
f. a protective arm pivotally engaged with said hammer rod, said protective arm comprising:
i. an arm connection portion having an arm rod hole formed therein;
ii. an arm spacer portion connected to said arm connection portion; and
iii. an arm distal end connected to said arm spacer portion.

8. The hammermill according to claim 7 wherein said multi-connector hammer is further defined as being forged.

9. The hammermill according to claim 7 wherein said multi-connector hammer is further defined as being forged.

10. The hammermill according to claim 7 wherein said protective arm is further defined as being forged.

11. The hammermill according to claim 7 wherein said protective arm further comprises a second arm rod hole.

12. The hammermill according to claim 7 wherein said multi-connector hammer is further defined as being less then seven (7) inches in length.

13. The hammermill according to claim 7 wherein said protective arm is further defined as being less than seven (7) inches in length.

14. The hammermill according to claim 7 wherein said multi-connector hammer is further defined as being forged.

* * * * *